United States Patent
Pan et al.

(10) Patent No.: US 7,437,135 B2
(45) Date of Patent: Oct. 14, 2008

(54) JOINT CHANNEL EQUALIZER INTERFERENCE CANCELLER ADVANCED RECEIVER

(75) Inventors: Jung-Lin Pan, Selden, NY (US); Robert A. DiFazio, Greenlawn, NY (US); Yingming Tsai, Boonton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 769 days.

(21) Appl. No.: 10/977,525

(22) Filed: Oct. 29, 2004

(65) Prior Publication Data
US 2005/0153663 A1 Jul. 14, 2005

Related U.S. Application Data

(60) Provisional application No. 60/515,683, filed on Oct. 30, 2003.

(51) Int. Cl.
*H04B 1/18* (2006.01)
(52) U.S. Cl. .............. 455/284; 455/63.1; 455/296; 455/561; 375/229; 375/348; 370/334
(58) Field of Classification Search ............. 455/63.1, 455/272, 278, 280, 284, 296, 501, 550.1, 455/561; 375/229, 346–348; 370/329, 330, 370/334
See application file for complete search history.

(56) References Cited

U.S. PATENT DOCUMENTS

| | | | |
|---|---|---|---|
| 4,852,090 A | 7/1989 | Borth | |
| 5,146,475 A | 9/1992 | Kubo | |
| 5,272,663 A | 12/1993 | Jones et al. | |
| 5,319,677 A | 6/1994 | Kim | |
| 5,331,666 A | 7/1994 | Dent | |
| 5,353,300 A | 10/1994 | Lee et al. | |
| 5,359,624 A | 10/1994 | Lee et al. | |
| 5,381,443 A | 1/1995 | Borth et al. | |
| 5,412,620 A | 5/1995 | Cafarella et al. | |
| 5,414,699 A | 5/1995 | Lee | |
| 5,425,050 A | 6/1995 | Schreiber et al. | |
| 5,448,206 A | 9/1995 | Newhall | |
| 5,457,704 A | 10/1995 | Hoeher et al. | |
| 5,465,396 A | 11/1995 | Hunsinger et al. | |
| 5,493,563 A | 2/1996 | Rozanski et al. | |
| 5,511,009 A | 4/1996 | Pastor | |
| 5,515,378 A | 5/1996 | Roy, III et al. | |
| 5,537,474 A | 7/1996 | Brown et al. | |
| 5,553,062 A | 9/1996 | Schilling et al. | |

(Continued)

FOREIGN PATENT DOCUMENTS

EP 0981206 A1 2/0000

(Continued)

*Primary Examiner*—Edward Urban
*Assistant Examiner*—Nhan T. Le
(74) *Attorney, Agent, or Firm*—Volpe and Koenig, P.C.

(57) ABSTRACT

At least one communication is transmitted from a plurality of transmitting antennas. A signal is received. For each transmitting antenna, the received signal is equalized with respect to a channel experience by the communication between the transmitting antenna and the signal receiving, producing symbols. A contribution of that transmitting antenna to the received signal is constructed using the produced symbols. The contribution of that transmitting antenna is subtracted from the received signal for use in further equalization of the received signal with respect to others of the transmitting antennas.

39 Claims, 7 Drawing Sheets

U.S. PATENT DOCUMENTS

| | | | |
|---|---|---|---|
| 5,559,881 A | 9/1996 | Sih | |
| 5,572,552 A | 11/1996 | Dent et al. | |
| 5,603,081 A | 2/1997 | Raith et al. | |
| 5,623,511 A | 4/1997 | Bar-David et al. | |
| 5,646,964 A | 7/1997 | Ushirokawa et al. | |
| 5,646,991 A | 7/1997 | Sih | |
| 5,655,215 A | 8/1997 | Diachina et al. | |
| 5,668,875 A | 9/1997 | Brown et al. | |
| 5,673,294 A | 9/1997 | Namekata | |
| 5,680,419 A | 10/1997 | Bottomley | |
| 5,687,229 A | 11/1997 | Sih | |
| 5,692,006 A | 11/1997 | Ross | |
| 5,694,416 A | 12/1997 | Johnson | |
| 5,719,852 A | 2/1998 | Schilling et al. | |
| 5,724,378 A | 3/1998 | Miki et al. | |
| 5,729,540 A | 3/1998 | Wegrzyn | |
| 5,739,788 A | 4/1998 | Dybdal et al. | |
| 5,745,525 A | 4/1998 | Hunsinger et al. | |
| 5,757,821 A | 5/1998 | Jamal et al. | |
| 5,757,853 A | 5/1998 | Tsujimoto | |
| 5,768,254 A | 6/1998 | Papadopoulos et al. | |
| 5,790,606 A | 8/1998 | Dent | |
| 5,793,820 A | 8/1998 | Vander Mey | |
| 5,796,814 A | 8/1998 | Brajal et al. | |
| 5,799,084 A | 8/1998 | Gallagher et al. | |
| 5,805,584 A | 9/1998 | Kingston et al. | |
| 5,809,058 A | 9/1998 | Sato | |
| 5,818,868 A | 10/1998 | Gaudenzi et al. | |
| 5,822,380 A | 10/1998 | Bottomley | |
| 5,822,701 A | 10/1998 | Tomisato et al. | |
| 5,828,658 A | 10/1998 | Ottersten et al. | |
| 5,831,984 A | 11/1998 | Hottinen | |
| 5,844,951 A | 12/1998 | Proakis et al. | |
| 5,848,105 A | 12/1998 | Gardner et al. | |
| 5,867,290 A | 2/1999 | Dutt et al. | |
| 5,892,397 A | 4/1999 | Belcher et al. | |
| 5,894,473 A | 4/1999 | Dent | |
| 5,903,834 A | 5/1999 | Wallstedt et al. | |
| 5,905,721 A | 5/1999 | Liu et al. | |
| 5,912,876 A | 6/1999 | H'mimy | |
| 5,930,369 A | 7/1999 | Cox et al. | |
| 5,933,457 A | 8/1999 | Hottinen | |
| 5,937,014 A | 8/1999 | Pelin et al. | |
| 5,943,425 A | 8/1999 | Mizikovsky | |
| 5,956,624 A | 9/1999 | Hunsinger et al. | |
| 5,966,411 A | 10/1999 | Struhsaker | |
| 5,982,825 A | 11/1999 | Tsujimoto | |
| 5,991,308 A | 11/1999 | Fuhrmann et al. | |
| 5,995,829 A | 11/1999 | Broderick | |
| 6,011,812 A | 1/2000 | Laakso et al. | |
| 6,026,130 A | 2/2000 | Rahmatullah et al. | |
| 6,038,440 A | 3/2000 | Wu | |
| 6,047,023 A | 4/2000 | Arnstein | |
| 6,047,071 A | 4/2000 | Shah | |
| 6,064,689 A | 5/2000 | Vollmer et al. | |
| 6,069,912 A | 5/2000 | Sawahashi et al. | |
| 6,078,611 A | 6/2000 | La Rosa et al. | |
| 6,081,566 A | 6/2000 | Molnar et al. | |
| 6,094,464 A | 7/2000 | Ebringer et al. | |
| 6,097,753 A | 8/2000 | Ko | |
| 6,108,424 A | 8/2000 | Pitiot | |
| 6,108,517 A | 8/2000 | Arsian et al. | |
| 6,125,137 A | 9/2000 | Wang et al. | |
| 6,128,389 A | 10/2000 | Chan et al. | |
| 6,137,785 A | 10/2000 | Bar-Ness | |
| 6,137,824 A | 10/2000 | Liu | |
| 6,137,843 A | 10/2000 | Chennakeshu et al. | |
| 6,141,334 A | 10/2000 | Flanagan et al. | |
| 6,148,041 A | 11/2000 | Dent | |
| 6,160,801 A | 12/2000 | Uchida et al. | |
| 6,161,209 A | 12/2000 | Moher | |
| 6,175,588 B1 | 1/2001 | Visotsky et al. | |
| 6,181,794 B1 | 1/2001 | Park et al. | |
| 6,195,546 B1 | 2/2001 | Leung et al. | |
| 6,195,782 B1 | 2/2001 | Rahmatullah et al. | |
| 6,208,295 B1 | 3/2001 | Dogan et al. | |
| 6,208,683 B1 | 3/2001 | Mizuguchi et al. | |
| 6,215,762 B1 | 4/2001 | Dent | |
| 6,215,814 B1 | 4/2001 | Ylitalo et al. | |
| 6,215,983 B1 | 4/2001 | Dogan et al. | |
| 6,219,341 B1 | 4/2001 | Varanasi | |
| 6,240,099 B1 | 5/2001 | Lim et al. | |
| 6,240,282 B1 | 5/2001 | Kleider et al. | |
| 6,246,698 B1 | 6/2001 | Kumar | |
| 6,259,688 B1 | 7/2001 | Schilling et al. | |
| 6,259,720 B1 | 7/2001 | Buss et al. | |
| 6,269,075 B1 | 7/2001 | Tran | |
| 6,289,005 B1 | 9/2001 | Katz | |
| 6,307,851 B1 | 10/2001 | Jung et al. | |
| 6,310,704 B1 | 10/2001 | Dogan et al. | |
| 6,311,043 B1 | 10/2001 | Haardt et al. | |
| 6,317,424 B1 | 11/2001 | Euscher | |
| 6,320,919 B1 | 11/2001 | Khayrallah et al. | |
| 6,321,066 B1 | 11/2001 | Katz et al. | |
| 6,321,082 B1 | 11/2001 | Katz | |
| 6,335,954 B1 | 1/2002 | Bottomley et al. | |
| 6,353,604 B2 | 3/2002 | Grimwood et al. | |
| 6,356,555 B1 | 3/2002 | Rakib et al. | |
| 6,363,104 B1 | 3/2002 | Bottomley | |
| 6,369,757 B1 | 4/2002 | Song et al. | |
| 6,373,888 B1 | 4/2002 | Lindoff | |
| 6,373,910 B1 | 4/2002 | Kingston et al. | |
| 6,377,611 B1 | 4/2002 | Hwang | |
| 6,381,461 B1 | 4/2002 | Besson et al. | |
| 6,392,595 B1 | 5/2002 | Katz et al. | |
| 6,396,801 B1 | 5/2002 | Upton et al. | |
| 6,400,761 B1 | 6/2002 | Smee et al. | |
| 6,400,781 B1 | 6/2002 | Vandendorpe et al. | |
| 6,404,803 B1 | 6/2002 | Wang et al. | |
| 6,426,973 B1 | 7/2002 | Madhow et al. | |
| 6,445,692 B1 | 9/2002 | Tsatsanis | |
| 6,456,647 B1 | 9/2002 | Banister | |
| 6,463,048 B1 | 10/2002 | Garyantes | |
| 6,470,044 B1 | 10/2002 | Kowalski | |
| 6,470,047 B1 | 10/2002 | Kleinerman et al. | |
| 6,470,192 B1 | 10/2002 | Karisson et al. | |
| 6,473,415 B1 | 10/2002 | Kim et al. | |
| 6,473,609 B1 | 10/2002 | Schwartz et al. | |
| 6,483,866 B1 | 11/2002 | Suzuki | |
| 6,484,285 B1 | 11/2002 | Dent | |
| 6,487,402 B1 | 11/2002 | Faus et al. | |
| 6,490,451 B1 | 12/2002 | Denman et al. | |
| 6,492,942 B1 | 12/2002 | Kezys | |
| 6,501,788 B1 | 12/2002 | Wang et al. | |
| 6,501,803 B1 | 12/2002 | Alamouti et al. | |
| 6,515,980 B1 | 2/2003 | Bottomley | |
| 6,529,495 B1 | 3/2003 | Aazhang et al. | |
| 6,529,709 B1 | 3/2003 | Shen et al. | |
| 6,539,067 B1 | 3/2003 | Luschi et al. | |
| 6,549,151 B1 | 4/2003 | Kober et al. | |
| 6,553,012 B1 | 4/2003 | Katz | |
| 6,556,634 B1 | 4/2003 | Dent | |
| 6,556,682 B1 | 4/2003 | Gilloire et al. | |
| 6,563,858 B1 | 5/2003 | Fakatselis et al. | |
| 6,564,037 B1 | 5/2003 | Sweatman et al. | |
| 6,570,910 B1 | 5/2003 | Bottomley et al. | |
| 6,570,918 B1 | 5/2003 | Rademacher | |
| 6,574,270 B1 | 6/2003 | Madkour et al. | |
| 6,577,606 B1 | 6/2003 | Lee et al. | |
| 6,603,801 B1 | 8/2003 | Andren et al. | |
| 6,606,314 B1 | 8/2003 | Bahrenburg et al. | |
| 6,614,836 B1 | 9/2003 | Halford et al. | |
| 6,618,431 B1 | 9/2003 | Lee | |
| 6,618,433 B1 | 9/2003 | Yellin | |

| | | |
|---|---|---|
| 6,621,808 B1 | 9/2003 | Sadri |
| 6,636,561 B1 | 10/2003 | Hudson |
| 6,643,526 B1 | 11/2003 | Katz |
| 6,647,070 B1 | 11/2003 | Shalvi et al. |
| 6,647,077 B1 | 11/2003 | Shan et al. |
| 6,650,617 B1 | 11/2003 | Belotserkovsky et al. |
| 6,650,881 B1 | 11/2003 | Dogan |
| 6,658,047 B1 | 12/2003 | Komulainen et al. |
| 6,658,269 B1 | 12/2003 | Golemon et al. |
| 6,658,619 B1 | 12/2003 | Chen |
| 6,665,349 B1 | 12/2003 | Cherubini et al. |
| 6,665,530 B1 | 12/2003 | Broyles et al. |
| 6,678,310 B1 | 1/2004 | Andren et al. |
| 6,680,969 B1 | 1/2004 | Molnar et al. |
| 6,683,924 B1 | 1/2004 | Ottosson et al. |
| 6,684,065 B2 | 1/2004 | Bult et al. |
| 6,694,154 B1 | 2/2004 | Molnar et al. |
| 6,697,441 B1 | 2/2004 | Bottemley et al. |
| 6,697,633 B1 | 2/2004 | Dogan et al. |
| 6,700,919 B1 | 3/2004 | Papasakellariou |
| 6,700,923 B1 | 3/2004 | Dowling et al. |
| 6,700,924 B1 | 3/2004 | Marzouki |
| 6,700,929 B1 | 3/2004 | Shan et al. |
| 6,704,376 B2 | 3/2004 | Mills et al. |
| 6,707,864 B2 | 3/2004 | Kim |
| 6,714,585 B1 | 3/2004 | Wang et al. |
| 6,721,293 B1 | 4/2004 | Komulainen et al. |
| 6,721,371 B1 | 4/2004 | Barham et al. |
| 6,724,743 B1 | 4/2004 | Pigeonnat |
| 6,728,324 B1 | 4/2004 | Shan et al. |
| 6,729,929 B1 | 5/2004 | Sayers et al. |
| 6,731,622 B1 | 5/2004 | Frank et al. |
| 6,731,700 B1 | 5/2004 | Yakhnich et al. |
| 6,741,637 B1 | 5/2004 | Shen et al. |
| 6,741,856 B2 | 5/2004 | McKenna et al. |
| 6,744,320 B2 | 6/2004 | Nguyen et al. |
| 6,744,806 B1 | 6/2004 | Moore et al. |
| 6,745,052 B2 | 6/2004 | Corbaton et al. |
| 6,745,352 B2 | 6/2004 | Cheng |
| 6,751,250 B2 | 6/2004 | Kirke et al. |
| 6,754,264 B1 | 6/2004 | Ben Rached et al. |
| 6,765,931 B1 | 7/2004 | Rabenko et al. |
| 6,768,714 B1 | 7/2004 | Heinonen et al. |
| 6,768,747 B1 | 7/2004 | Dogan |
| 6,980,602 B1 * | 12/2005 | Kleinerman et al. ........ 375/262 |
| 7,184,743 B2 * | 2/2007 | Walton et al. ............ 455/343.4 |
| 7,359,466 B2 * | 4/2008 | Huang et al. ................ 375/349 |
| 2001/0001616 A1 | 5/2001 | Rakib et al. |
| 2001/0017883 A1 | 8/2001 | Tiirola et al. |
| 2001/0028677 A1 | 10/2001 | Wang et al. |
| 2001/0030993 A1 | 10/2001 | Bottomley et al. |
| 2001/0033583 A1 | 10/2001 | Rabenko et al. |
| 2001/0036223 A1 | 11/2001 | Webster et al. |
| 2001/0038665 A1 | 11/2001 | Baltersee et al. |
| 2001/0038674 A1 | 11/2001 | Trans |
| 2001/0050926 A1 | 12/2001 | Kumar |
| 2002/0001294 A1 | 1/2002 | Amouris |
| 2002/0003846 A1 | 1/2002 | Khayrallah et al. |
| 2002/0009135 A1 | 1/2002 | Omura et al. |
| 2002/0018450 A1 | 2/2002 | McKenna et al. |
| 2002/0018529 A1 | 2/2002 | Dabak et al. |
| 2002/0019228 A1 | 2/2002 | McKenna et al. |
| 2002/0021747 A1 | 2/2002 | Sequeira |
| 2002/0021750 A1 | 2/2002 | Belotserkovsky et al. |
| 2002/0027957 A1 | 3/2002 | Paulraj et al. |
| 2002/0028655 A1 | 3/2002 | Rosener et al. |
| 2002/0033766 A1 | 3/2002 | Pratt |
| 2002/0037027 A1 | 3/2002 | Medlock et al. |
| 2002/0037028 A1 | 3/2002 | Baltersee et al. |
| 2002/0037716 A1 | 3/2002 | McKenna et al. |
| 2002/0037733 A1 | 3/2002 | McKenna et al. |
| 2002/0039907 A1 | 4/2002 | McKenna et al. |
| 2002/0041637 A1 | 4/2002 | Smart et al. |
| 2002/0044540 A1 | 4/2002 | Mottier et al. |
| 2002/0045432 A1 | 4/2002 | Yoshida |
| 2002/0045462 A1 | 4/2002 | Mottier |
| 2002/0051433 A1 | 5/2002 | Affes et al. |
| 2002/0054621 A1 | 5/2002 | Kyeong et al. |
| 2002/0054623 A1 | 5/2002 | Wang et al. |
| 2002/0057660 A1 | 5/2002 | Park et al. |
| 2002/0057730 A1 | 5/2002 | Karisson et al. |
| 2002/0060999 A1 | 5/2002 | Ma et al. |
| 2002/0064139 A1 | 5/2002 | Bist et al. |
| 2002/0067761 A1 | 6/2002 | Kong et al. |
| 2002/0067762 A1 | 6/2002 | Neufeld et al. |
| 2002/0072336 A1 | 6/2002 | Mottier |
| 2002/0075832 A1 | 6/2002 | Kim et al. |
| 2002/0080746 A1 | 6/2002 | Kim et al. |
| 2002/0080859 A1 | 6/2002 | Mottier |
| 2002/0080863 A1 | 6/2002 | Nielsen |
| 2002/0089953 A1 | 7/2002 | Kim et al. |
| 2002/0089955 A1 | 7/2002 | Kim et al. |
| 2002/0093927 A1 | 7/2002 | Kim et al. |
| 2002/0097699 A1 | 7/2002 | Kim et al. |
| 2002/0098864 A1 | 7/2002 | Mukai et al. |
| 2002/0101845 A1 | 8/2002 | Kim et al. |
| 2002/0105928 A1 | 8/2002 | Kapoor et al. |
| 2002/0109631 A1 | 8/2002 | Li et al. |
| 2002/0110108 A1 | 8/2002 | Kim et al. |
| 2002/0110206 A1 | 8/2002 | Becker et al. |
| 2002/0114410 A1 | 8/2002 | Brunel |
| 2002/0118784 A1 | 8/2002 | Teo et al. |
| 2002/0119803 A1 | 8/2002 | Bitterlich et al. |
| 2002/0122392 A1 | 9/2002 | Elezabi et al. |
| 2002/0122406 A1 | 9/2002 | Chillariga et al. |
| 2002/0122498 A1 | 9/2002 | Dogan |
| 2002/0122510 A1 | 9/2002 | Yakhnich et al. |
| 2002/0126619 A1 | 9/2002 | De et al. |
| 2002/0126644 A1 | 9/2002 | Turpin et al. |
| 2002/0126740 A1 | 9/2002 | Giannakis et al. |
| 2002/0126773 A1 | 9/2002 | Brunel |
| 2002/0126779 A1 | 9/2002 | Denno |
| 2002/0131384 A1 | 9/2002 | De et al. |
| 2002/0136158 A1 | 9/2002 | Frank |
| 2002/0136160 A1 | 9/2002 | De et al. |
| 2002/0137546 A1 | 9/2002 | Miya et al. |
| 2002/0141373 A1 | 10/2002 | De et al. |
| 2002/0141486 A1 | 10/2002 | Bottomley et al. |
| 2002/0145989 A1 | 10/2002 | De et al. |
| 2002/0146044 A1 | 10/2002 | Esmailzadeh et al. |
| 2002/0146062 A1 | 10/2002 | Bachu et al. |
| 2002/0150109 A1 | 10/2002 | Agee |
| 2002/0150182 A1 | 10/2002 | Dogan et al. |
| 2002/0150187 A1 | 10/2002 | Chugg et al. |
| 2002/0154620 A1 | 10/2002 | Azenkot et al. |
| 2002/0154704 A1 | 10/2002 | Reshef |
| 2002/0163977 A1 | 11/2002 | Kobayakawa |
| 2002/0166124 A1 | 11/2002 | Gurantz et al. |
| 2002/0167999 A1 * | 11/2002 | Naito et al. ................ 375/229 |
| 2002/0172265 A1 | 11/2002 | Kenney |
| 2002/0173336 A1 | 11/2002 | Ranta et al. |
| 2002/0176393 A1 | 11/2002 | Maruyama |
| 2002/0176521 A1 | 11/2002 | Kirke et al. |
| 2002/0177427 A1 | 11/2002 | Nadgauda et al. |
| 2002/0177447 A1 | 11/2002 | Walton et al. |
| 2002/0181388 A1 | 12/2002 | Jain et al. |
| 2002/0181430 A1 | 12/2002 | Thomas et al. |
| 2002/0181555 A1 | 12/2002 | Roumy et al. |
| 2002/0181557 A1 | 12/2002 | Fujii |
| 2002/0181561 A1 | 12/2002 | Sano |
| 2002/0186650 A1 | 12/2002 | Castelain |
| 2002/0186707 A1 | 12/2002 | Roumy et al. |
| 2002/0186761 A1 | 12/2002 | Corbaton et al. |
| 2002/0190786 A1 | 12/2002 | Yoon et al. |
| 2002/0191568 A1 | 12/2002 | Ghosh |
| 2002/0191582 A1 | 12/2002 | Miya et al. |

| | | | | | | |
|---|---|---|---|---|---|---|
| 2002/0196871 A1 | 12/2002 | Nishio et al. | | 2003/0153322 A1 | 8/2003 | Burke et al. |
| 2003/0002568 A1 | 1/2003 | Dabak et al. | | 2003/0156635 A1 | 8/2003 | Fernandez-Corbaton et al. |
| 2003/0012263 A1 | 1/2003 | Lu | | 2003/0157954 A1 | 8/2003 | Medvedev et al. |
| 2003/0013468 A1 | 1/2003 | Khatri | | 2003/0161282 A1 | 8/2003 | Medvedev et al. |
| 2003/0016640 A1 | 1/2003 | Onggosanusi et al. | | 2003/0161383 A1 | 8/2003 | Mower et al. |
| 2003/0016770 A1 | 1/2003 | Trans et al. | | 2003/0161421 A1 | 8/2003 | Schmidt et al. |
| 2003/0021335 A1 | 1/2003 | De et al. | | 2003/0161422 A1 | 8/2003 | Bi |
| 2003/0022636 A1 | 1/2003 | Ylitalo et al. | | 2003/0166398 A1 | 9/2003 | Netanel |
| 2003/0022680 A1 | 1/2003 | Shreve | | 2003/0174794 A1 | 9/2003 | Xu et al. |
| 2003/0026236 A1 | 2/2003 | De et al. | | 2003/0179698 A1 | 9/2003 | Lu |
| 2003/0026325 A1 | 2/2003 | De et al. | | 2003/0179812 A1 | 9/2003 | Carbone et al. |
| 2003/0026326 A1 | 2/2003 | Jayaraman et al. | | 2003/0189997 A1* | 10/2003 | Shanbhag et al. ............ 375/348 |
| 2003/0026345 A1 | 2/2003 | Muharemovic et al. | | 2003/0193970 A1 | 10/2003 | Kim et al. |
| 2003/0026349 A1 | 2/2003 | Onggosanusi et al. | | 2003/0198210 A1 | 10/2003 | Haim |
| 2003/0027598 A1 | 2/2003 | Corbaton et al. | | 2003/0198305 A1 | 10/2003 | Taylor et al. |
| 2003/0035469 A1 | 2/2003 | Frank et al. | | 2003/0202499 A1 | 10/2003 | Thron et al. |
| 2003/0036359 A1 | 2/2003 | Dent et al. | | 2003/0202569 A1 | 10/2003 | Kim et al. |
| 2003/0039302 A1 | 2/2003 | Castelain et al. | | 2003/0203723 A1 | 10/2003 | Persson et al. |
| 2003/0048800 A1 | 3/2003 | Kilfoyle et al. | | 2003/0206575 A1 | 11/2003 | Bertrand et al. |
| 2003/0053524 A1 | 3/2003 | Dent | | 2003/0215003 A1 | 11/2003 | Bottomley et al. |
| 2003/0053571 A1 | 3/2003 | Belotserkovsky et al. | | 2003/0215004 A1 | 11/2003 | Vihriala |
| 2003/0058929 A1 | 3/2003 | Cox et al. | | 2003/0216154 A1 | 11/2003 | Mennenga et al. |
| 2003/0063680 A1 | 4/2003 | Nedic et al. | | 2003/0218998 A1 | 11/2003 | Kim et al. |
| 2003/0067968 A1 | 4/2003 | Papasakellariou et al. | | 2003/0219064 A1 | 11/2003 | Pan et al. |
| 2003/0067971 A1 | 4/2003 | Miyoshi et al. | | 2003/0219065 A1 | 11/2003 | Zeira |
| 2003/0076872 A1 | 4/2003 | Jalloul et al. | | 2003/0220122 A1 | 11/2003 | Lim et al. |
| 2003/0076875 A1 | 4/2003 | Oates | | 2003/0223398 A1 | 12/2003 | Haim et al. |
| 2003/0076900 A1 | 4/2003 | Magee et al. | | 2003/0223489 A1 | 12/2003 | Smee et al. |
| 2003/0078025 A1 | 4/2003 | Smee et al. | | 2003/0227960 A1 | 12/2003 | Papaskellariou |
| 2003/0081701 A1 | 5/2003 | Pick et al. | | 2003/0227962 A1 | 12/2003 | Hintz-Madsen |
| 2003/0081781 A1 | 5/2003 | Jensen et al. | | 2004/0001426 A1 | 1/2004 | Mailaender et al. |
| 2003/0086515 A1* | 5/2003 | Trans et al. .................. 375/346 | | 2004/0001528 A1 | 1/2004 | Kim et al. |
| 2003/0087622 A1 | 5/2003 | Jayaraman et al. | | 2004/0008803 A1 | 1/2004 | Aldrovandi et al. |
| 2003/0091007 A1 | 5/2003 | Becker et al. | | 2004/0013171 A1 | 1/2004 | Pan et al. |
| 2003/0092403 A1 | 5/2003 | Shapira et al. | | 2004/0013205 A1 | 1/2004 | Brunel |
| 2003/0092447 A1 | 5/2003 | Bottomley et al. | | 2004/0014424 A1 | 1/2004 | Kristensson et al. |
| 2003/0092456 A1 | 5/2003 | Dent | | 2004/0015529 A1 | 1/2004 | Tanrikulu et al. |
| 2003/0095529 A1 | 5/2003 | Petre et al. | | 2004/0017843 A1 | 1/2004 | Fitton et al. |
| 2003/0095531 A1 | 5/2003 | Soerensen et al. | | 2004/0022179 A1 | 2/2004 | Giannakis et al. |
| 2003/0095585 A1 | 5/2003 | Huh et al. | | 2004/0028013 A1 | 2/2004 | Fitton et al. |
| 2003/0095586 A1 | 5/2003 | Geers | | 2004/0028121 A1 | 2/2004 | Fitton et al. |
| 2003/0099216 A1 | 5/2003 | Nilsson et al. | | 2004/0028157 A1 | 2/2004 | Aoki et al. |
| 2003/0108091 A1 | 6/2003 | Nishio et al. | | 2004/0032848 A1 | 2/2004 | Papasakellariou |
| 2003/0109225 A1 | 6/2003 | Aldajani et al. | | 2004/0032900 A1 | 2/2004 | Horng et al. |
| 2003/0112796 A1 | 6/2003 | Kwan | | 2004/0033791 A1 | 2/2004 | Schmidl et al. |
| 2003/0112901 A1 | 6/2003 | Gupta | | 2004/0037354 A1 | 2/2004 | Jayaraman et al. |
| 2003/0114125 A1 | 6/2003 | Sourour et al. | | 2004/0037380 A1 | 2/2004 | Shan |
| 2003/0114126 A1 | 6/2003 | Wang et al. | | 2004/0038653 A1 | 2/2004 | Claussen et al. |
| 2003/0123525 A1 | 7/2003 | Smee et al. | | 2004/0042531 A1 | 3/2004 | Arikan et al. |
| 2003/0123585 A1 | 7/2003 | Yen | | 2004/0042537 A1 | 3/2004 | Frank |
| 2003/0123586 A1 | 7/2003 | Yen | | 2004/0043788 A1 | 3/2004 | Mittal |
| 2003/0125090 A1 | 7/2003 | Zeira | | 2004/0047401 A1 | 3/2004 | Keller et al. |
| 2003/0125091 A1 | 7/2003 | Choi et al. | | 2004/0047403 A1 | 3/2004 | Choi et al. |
| 2003/0126545 A1 | 7/2003 | Tan | | 2004/0052303 A1 | 3/2004 | Noguet et al. |
| 2003/0128770 A1 | 7/2003 | Chenu-Tournier et al. | | 2004/0062302 A1 | 4/2004 | Fujii et al. |
| 2003/0129984 A1 | 7/2003 | Dent | | 2004/0062317 A1 | 4/2004 | Uesugi et al. |
| 2003/0133421 A1 | 7/2003 | Sundar et al. | | 2004/0068748 A1 | 4/2004 | Currivan et al. |
| 2003/0133424 A1 | 7/2003 | Liang et al. | | 2004/0076224 A1 | 4/2004 | Onggosanusi et al. |
| 2003/0134636 A1 | 7/2003 | Sundar et al. | | 2004/0076244 A1 | 4/2004 | Juntti et al. |
| 2003/0134638 A1 | 7/2003 | Sundar et al. | | 2004/0085890 A1 | 5/2004 | Love et al. |
| 2003/0134650 A1 | 7/2003 | Sundar et al. | | 2004/0086035 A1 | 5/2004 | Upton et al. |
| 2003/0137426 A1 | 7/2003 | Anthony et al. | | 2004/0086036 A1 | 5/2004 | Eckhardt et al. |
| 2003/0138035 A1 | 7/2003 | Mills | | 2004/0086038 A1 | 5/2004 | Kilbank |
| 2003/0138040 A1* | 7/2003 | Rouphael et al. ............ 375/233 | | 2004/0091023 A1 | 5/2004 | Chen et al. |
| 2003/0139139 A1 | 7/2003 | Onggosanusi et al. | | 2004/0097204 A1 | 5/2004 | Jung et al. |
| 2003/0139189 A1 | 7/2003 | Alexander, Jr. | | 2004/0100403 A1 | 5/2004 | Park et al. |
| 2003/0142726 A1 | 7/2003 | Eltawil et al. | | 2004/0101032 A1 | 5/2004 | Dabak et al. |
| 2003/0142732 A1 | 7/2003 | Moshavi et al. | | 2004/0101068 A1 | 5/2004 | Wang et al. |
| 2003/0142762 A1 | 7/2003 | Burke | | 2004/0101072 A1 | 5/2004 | Fitton et al. |
| 2003/0146870 A1 | 8/2003 | Guo et al. | | 2004/0105489 A1 | 6/2004 | Kim et al. |
| 2003/0147455 A1 | 8/2003 | Simoni et al. | | 2004/0105515 A1 | 6/2004 | Mo et al. |
| 2003/0152099 A1 | 8/2003 | Chun et al. | | 2004/0114544 A1 | 6/2004 | Chiuch et al. |
| 2003/0153273 A1 | 8/2003 | Ebert et al. | | 2004/0114670 A1 | 6/2004 | Cranford, Jr. et al. |

| | | | |
|---|---|---|---|
| 2004/0114674 A1 | 6/2004 | Lotter et al. | |
| 2004/0114695 A1 | 6/2004 | Astely et al. | |
| 2004/0116078 A1 | 6/2004 | Rooyen et al. | |
| 2004/0116122 A1 | 6/2004 | Zeira et al. | |
| 2004/0120308 A1 | 6/2004 | LeBlanc | |
| 2004/0125785 A1 | 7/2004 | DiFazio et al. | |
| 2004/0125859 A1 | 7/2004 | Green et al. | |
| 2004/0125863 A1 | 7/2004 | Ghosh | |
| 2004/0132430 A1 | 7/2004 | Shino et al. | |
| 2004/0136316 A1 | 7/2004 | Kwak et al. | |
| 2004/0136472 A1 | 7/2004 | Vigoda et al. | |
| 2004/0141480 A1 | 7/2004 | Kim et al. | |
| 2004/0141565 A1 | 7/2004 | Kwak et al. | |

FOREIGN PATENT DOCUMENTS

| | | |
|---|---|---|
| EP | 0642243 A1 | 9/1993 |
| EP | 0607755 A1 | 12/1993 |
| EP | 0674455 A1 | 10/1994 |
| EP | 0691754 A2 | 1/1996 |
| EP | 0701344 A1 | 3/1996 |
| EP | 0715421 A2 | 6/1996 |
| EP | 0755141 A2 | 1/1997 |
| EP | 0762671 A1 | 3/1997 |
| EP | 0766468 A2 | 4/1997 |
| EP | 0782275 A2 | 7/1997 |
| EP | 0784311 A1 | 7/1997 |
| EP | 0806844 A1 | 11/1997 |
| EP | 0858175 A2 | 2/1998 |
| EP | 0851600 A2 | 7/1998 |
| EP | 0858186 A2 | 8/1998 |
| EP | 0883318 A1 | 12/1998 |
| EP | 0884857 A2 | 12/1998 |
| EP | 0889661 A2 | 1/1999 |
| EP | 0892508 A2 | 1/1999 |
| EP | 1303058 A2 | 5/1999 |
| EP | 0926913 A2 | 6/1999 |
| EP | 0932263 A2 | 7/1999 |
| EP | 0936749 A1 | 8/1999 |
| EP | 0955742 A2 | 11/1999 |
| EP | 0957592 A2 | 11/1999 |
| EP | 0955783 A3 | 1/2000 |
| EP | 0971485 A1 | 1/2000 |
| EP | 0977393 A1 | 2/2000 |
| EP | 0978951 A2 | 2/2000 |
| EP | 0980149 A2 | 2/2000 |
| EP | 0987868 A2 | 3/2000 |
| EP | 0994570 A1 | 4/2000 |
| EP | 1003297 A2 | 5/2000 |
| EP | 1011211 A1 | 6/2000 |
| EP | 1017183 A2 | 7/2000 |
| EP | 1022862 A2 | 7/2000 |
| EP | 1035681 A2 | 9/2000 |
| EP | 1017182 A3 | 10/2000 |
| EP | 1059784 A1 | 12/2000 |
| EP | 1071222 A2 | 1/2001 |
| EP | 1081980 A1 | 3/2001 |
| EP | 1091506 A3 | 5/2001 |
| EP | 1107524 A2 | 6/2001 |
| EP | 1124346 A1 | 8/2001 |
| EP | 1146657 A1 | 10/2001 |
| EP | 1156592 A2 | 11/2001 |
| EP | 1164734 A1 | 12/2001 |
| EP | 1175022 A2 | 1/2002 |
| EP | 1179891 A2 | 2/2002 |
| EP | 1220355 A1 | 7/2002 |
| EP | 1227598 A2 | 7/2002 |
| EP | 1229668 A2 | 8/2002 |
| EP | 1244232 A1 | 9/2002 |
| EP | 1271835 A2 | 1/2003 |
| EP | 1274176 A1 | 1/2003 |
| EP | 1274177 A2 | 1/2003 |
| EP | 1276251 A1 | 1/2003 |
| EP | 1294150 A2 | 2/2003 |
| EP | 1289162 A2 | 3/2003 |
| EP | 1292048 A1 | 3/2003 |
| EP | 1292049 A2 | 3/2003 |
| EP | 1296462 A1 | 3/2003 |
| EP | 1303092 A2 | 4/2003 |
| EP | 1304815 A2 | 4/2003 |
| EP | 1151553 B1 | 5/2003 |
| EP | 1306979 A1 | 5/2003 |
| EP | 1306980 A1 | 5/2003 |
| EP | 1309096 A1 | 5/2003 |
| EP | 1318613 A2 | 6/2003 |
| EP | 1320200 A1 | 6/2003 |
| EP | 1335504 A2 | 8/2003 |
| EP | 1335518 A1 | 8/2003 |
| EP | 1339196 A1 | 8/2003 |
| EP | 1341319 A1 | 9/2003 |
| EP | 1345338 A1 | 9/2003 |
| EP | 1351426 A1 | 10/2003 |
| EP | 1353451 A1 | 10/2003 |
| EP | 1357714 A1 | 10/2003 |
| EP | 1359679 A2 | 11/2003 |
| EP | 1363405 A2 | 11/2003 |
| EP | 1365518 A1 | 11/2003 |
| EP | 1367846 A1 | 12/2003 |
| EP | 1372308 A1 | 12/2003 |
| EP | 1383263 A1 | 1/2004 |
| EP | 1376896 A1 | 2/2004 |
| EP | 1392017 A1 | 2/2004 |
| EP | 1395078 A2 | 3/2004 |
| EP | 1396943 A1 | 3/2004 |
| EP | 1404047 A2 | 3/2004 |
| EP | 1406395 A2 | 4/2004 |
| EP | 1422596 A2 | 5/2004 |
| EP | 1422850 A1 | 5/2004 |
| EP | 1427155 A2 | 6/2004 |
| EP | 1427159 A2 | 6/2004 |
| EP | 1432168 A1 | 6/2004 |
| EP | 1434369 A2 | 6/2004 |
| EP | 1434416 A2 | 6/2004 |
| EP | 1437842 A1 | 7/2004 |
| EP | 1439676 A2 | 7/2004 |
| WO | 88/05981 | 8/1988 |
| WO | 94/00918 | 1/1994 |
| WO | 94/01956 | 1/1994 |
| WO | 94/08418 | 4/1994 |
| WO | 94/16506 | 7/1994 |
| WO | 94/29985 | 12/1994 |
| WO | 95/01033 A1 | 1/1995 |
| WO | 95/04413 | 2/1995 |
| WO | 95/08890 | 3/1995 |
| WO | 95/12930 A1 | 5/1995 |
| WO | 95/12934 | 5/1995 |
| WO | 95/09493 | 6/1995 |
| WO | 95/20842 | 8/1995 |
| WO | 95/21511 | 8/1995 |
| WO | 95/22209 | 8/1995 |
| WO | 95/22818 | 8/1995 |
| WO | 95/26094 A1 | 9/1995 |
| WO | 95/27349 | 10/1995 |
| WO | 95/34140 | 12/1995 |
| WO | 96/06487 | 2/1996 |
| WO | 96/11533 | 4/1996 |
| WO | 96/11534 | 4/1996 |
| WO | 96/37062 | 11/1996 |
| WO | 97/05709 | 2/1997 |
| WO | 97/08861 | 3/1997 |
| WO | 97/13353 | 4/1997 |
| WO | 97/13386 | 4/1997 |
| WO | 97/19522 | 5/1997 |
| WO | 97/24816 | 7/1997 |
| WO | 97/32413 | 9/1997 |
| WO | 97/34421 | 9/1997 |

| | | | | | | |
|---|---|---|---|---|---|---|
| WO | 97/37427 | 10/1997 | | WO | 01/69801 A2 | 9/2001 |
| WO | 97/38540 | 10/1997 | | WO | 01/71996 A2 | 9/2001 |
| WO | 97/41647 | 11/1997 | | WO | 01/89107 A1 | 11/2001 |
| WO | 97/49207 | 12/1997 | | WO | 01/91317 A1 | 11/2001 |
| WO | 98/01960 | 1/1998 | | WO | 01/93436 A2 | 12/2001 |
| WO | 98/18272 | 4/1998 | | WO | 02/03092 A1 | 1/2002 |
| WO | 98/19493 | 5/1998 | | WO | 02/05447 A2 | 1/2002 |
| WO | 98/24192 | 6/1998 | | WO | 02/05502 A1 | 1/2002 |
| WO | 98/28903 | 7/1998 | | WO | 02/05506 A1 | 1/2002 |
| WO | 98/36596 | 8/1998 | | WO | 02/09297 A2 | 1/2002 |
| WO | 98/36598 | 8/1998 | | WO | 02/09298 A2 | 1/2002 |
| WO | 98/36599 | 8/1998 | | WO | 02/09305 A2 | 1/2002 |
| WO | 98/40970 | 9/1998 | | WO | 02/11304 A2 | 2/2002 |
| WO | 98/47243 A2 | 10/1998 | | WO | 02/11311 A2 | 2/2002 |
| WO | 98/56146 | 12/1998 | | WO | 02/11387 A1 | 2/2002 |
| WO | 98/59518 | 12/1998 | | WO | 02/13491 A2 | 2/2002 |
| WO | 99/04537 | 1/1999 | | WO | 02/17508 A2 | 2/2002 |
| WO | 99/07077 A2 | 2/1999 | | WO | 02/19563 A2 | 3/2002 |
| WO | 99/12283 | 3/1999 | | WO | 02/19738 A2 | 3/2002 |
| WO | 99/14871 | 3/1999 | | WO | 02/21714 A1 | 3/2002 |
| WO | 99/23849 | 5/1999 | | WO | 02/23667 A2 | 3/2002 |
| WO | 99/48308 | 9/1999 | | WO | 02/23751 A1 | 3/2002 |
| WO | 99/52311 | 10/1999 | | WO | 02/23752 A1 | 3/2002 |
| WO | 99/59266 | 11/1999 | | WO | 02/23753 A1 | 3/2002 |
| WO | 99/60720 | 11/1999 | | WO | 02/23754 A2 | 3/2002 |
| WO | 99/62197 | 12/1999 | | WO | 02/23758 A1 | 3/2002 |
| WO | 99/62280 | 12/1999 | | WO | 02/23787 A2 | 3/2002 |
| WO | 99/63677 | 12/1999 | | WO | 02/23824 A2 | 3/2002 |
| WO | 00/16494 | 3/2000 | | WO | 02/25831 A2 | 3/2002 |
| WO | 00/25438 | 5/2000 | | WO | 02/31995 A2 | 3/2002 |
| WO | 00/33472 | 6/2000 | | WO | 02/27961 A2 | 4/2002 |
| WO | 00/35159 | 6/2000 | | WO | 02/29993 A1 | 4/2002 |
| WO | 00/41337 | 7/2000 | | WO | 02/32004 A1 | 4/2002 |
| WO | 00/44111 | 7/2000 | | WO | 02/35719 A2 | 5/2002 |
| WO | 00/44141 | 7/2000 | | WO | 02/35745 A1 | 5/2002 |
| WO | 00/44190 | 7/2000 | | WO | 02/35857 A1 | 5/2002 |
| WO | 00/46922 | 8/2000 | | WO | 02/39610 A1 | 5/2002 |
| WO | 00/48330 | 8/2000 | | WO | 02/43263 A1 | 5/2002 |
| WO | 00/48332 | 8/2000 | | WO | 02/47278 A2 | 6/2002 |
| WO | 00/49720 | 8/2000 | | WO | 02/054601 A1 | 7/2002 |
| WO | 00/51250 A1 | 8/2000 | | WO | 02/054613 A1 | 7/2002 |
| WO | 00/51260 A1 | 8/2000 | | WO | 02/067444 A1 | 8/2002 |
| WO | 00/54418 | 9/2000 | | WO | 02/0655719 A1 | 8/2002 |
| WO | 00/62470 | 10/2000 | | WO | 02/073822 A1 | 9/2002 |
| WO | 00/69192 A1 | 11/2000 | | WO | 02/075950 A1 | 9/2002 |
| WO | 00/72459 A1 | 11/2000 | | WO | 02/078205 A1 | 10/2002 |
| WO | 00/74332 A1 | 12/2000 | | WO | 02/080382 A1 | 10/2002 |
| WO | 00/77942 A1 | 12/2000 | | WO | 02/080432 | 10/2002 |
| WO | 00/77994 A1 | 12/2000 | | WO | 02/082268 A1 | 10/2002 |
| WO | 01/05088 A1 | 1/2001 | | WO | 02/084892 A1 | 10/2002 |
| WO | 01/05091 A1 | 1/2001 | | WO | 02/0803979 A2 | 10/2002 |
| WO | 01/10065 A1 | 2/2001 | | WO | 02/029977 A2 | 11/2002 |
| WO | 01/13530 A1 | 2/2001 | | WO | 02/093782 A1 | 11/2002 |
| WO | 01/19120 A1 | 3/2001 | | WO | 02/100033 A1 | 12/2002 |
| WO | 01/20801 A1 | 3/2001 | | WO | 03/003604 A1 | 1/2003 |
| WO | 01/20919 A1 | 3/2001 | | WO | 03/005291 A1 | 1/2003 |
| WO | 01/22610 A1 | 3/2001 | | WO | 03/010898 A1 | 2/2003 |
| WO | 01/22710 A2 | 3/2001 | | WO | 03/010899 A1 | 2/2003 |
| WO | 02/19005 A1 | 3/2001 | | WO | 03/013018 A2 | 2/2003 |
| WO | 01/24381 A1 | 4/2001 | | WO | 03/013088 A2 | 2/2003 |
| WO | 01/28174 A1 | 4/2001 | | WO | 03/015306 A1 | 2/2003 |
| WO | 01/29963 A1 | 4/2001 | | WO | 03/021373 A2 | 3/2003 |
| WO | 01/29983 A1 | 4/2001 | | WO | 03/021805 A1 | 3/2003 |
| WO | 01/33791 A1 | 5/2001 | | WO | 03/021812 A1 | 3/2003 |
| WO | 01/39392 A1 | 5/2001 | | WO | 03/028246 A2 | 3/2003 |
| WO | 01/43302 A1 | 6/2001 | | WO | 03/028229 A1 | 4/2003 |
| WO | 01/45287 A1 | 6/2001 | | WO | 03/030552 A1 | 4/2003 |
| WO | 01/45289 A1 | 6/2001 | | WO | 03/034604 A1 | 4/2003 |
| WO | 01/52489 A1 | 7/2001 | | WO | 03/036799 A1 | 5/2003 |
| WO | 01/54303 A1 | 7/2001 | | WO | 03/036867 A1 | 5/2003 |
| WO | 01/56204 A1 | 8/2001 | | WO | 03/041291 A1 | 5/2003 |
| WO | 01/60103 A1 | 8/2001 | | WO | 03/041292 A1 | 5/2003 |
| WO | 01/67665 A2 | 9/2001 | | WO | 03/043236 A1 | 5/2003 |

| | | | | | | |
|---|---|---|---|---|---|---|
| WO | 03/052957 | A1 | 6/2003 | WO | 2004/010573 A1 | 1/2004 |
| WO | 03/058839 | A1 | 7/2003 | WO | 2004/001341 A1 | 2/2004 |
| WO | 03/058871 | A1 | 7/2003 | WO | 2004/012359 A2 | 2/2004 |
| WO | 03/061177 | A2 | 7/2003 | WO | 2004/012366 A1 | 2/2004 |
| WO | 03/061301 | A2 | 7/2003 | WO | 2004/015884 A2 | 2/2004 |
| WO | 03/065605 | A1 | 8/2003 | WO | 2004/015949 A1 | 2/2004 |
| WO | 03/065635 | | 8/2003 | WO | 2004/019447 A2 | 3/2004 |
| WO | 03/073637 | A1 | 9/2003 | WO | 2004/021599 A1 | 3/2004 |
| WO | 03/079759 | A2 | 10/2003 | WO | 2004/021680 A2 | 3/2004 |
| WO | 03/084080 | A2 | 10/2003 | WO | 2004/023671 A1 | 3/2004 |
| WO | 03/084097 | A1 | 10/2003 | WO | 2004/038600 A1 | 5/2004 |
| WO | 03/084254 | A1 | 10/2003 | WO | 2004/038936 A2 | 5/2004 |
| WO | 03/085830 | | 10/2003 | WO | 2004/040779 A2 | 5/2004 |
| WO | 03/090024 | A2 | 10/2003 | WO | 2004/040789 A2 | 5/2004 |
| WO | 03/092236 | A1 | 11/2003 | WO | 2004/040869 A1 | 5/2004 |
| WO | 03/094378 | | 11/2003 | WO | 2004/045103 A1 | 5/2004 |
| WO | 03/101001 | A1 | 12/2003 | WO | 2004/046901 A2 | 6/2004 |
| WO | 03/101012 | A1 | 12/2003 | WO | 2004/047269 A2 | 6/2004 |
| WO | 03/107570 | A1 | 12/2003 | WO | 2004/049595 A1 | 6/2004 |
| WO | 03/107688 | A2 | 12/2003 | WO | 2004/054101 A1 | 6/2004 |
| WO | 2004/001893 | A2 | 12/2003 | WO | 2004/056002 A1 | 7/2004 |
| WO | 2004/002038 | A1 | 12/2003 | WO | 2004/059878 A1 | 7/2004 |
| WO | 2004/003743 | A1 | 1/2004 | WO | 2004/062158 A2 | 7/2004 |
| WO | 2004/008647 | A2 | 1/2004 | | | |
| WO | 2004/010572 | A1 | 1/2004 | | | |

* cited by examiner

JOINT CHANNEL EQUALIZER INTERFERENCE CANCELLER ADVANCED RECEIVER

CROSS REFERENCE TO RELATED APPLICATION(S)

This application claims the benefit of U.S. provisional application No. 60/515,683, filed Oct. 30, 2003, which is incorporated by reference as if fully set forth.

FIELD OF INVENTION

This invention generally relates to wireless communications. In particular, the invention relates receiving communication in such systems.

BACKGROUND

As the demand for higher data rate services grows, the data rates transferred on wireless channels are increasing. In Universal Mobile Terrestrial Systems communication systems, high data rate high speed downlink packet access (HSDPA) and enhanced uplink channels are being developed. Similarly, CDMA2000 EVDV and EV-DO also use high data rate channels.

As the data rates supported by channels increases, the desire for higher performance receivers also increases. To transmit high amounts of data through these channels, more aggressive modulation and coding schemes are utilized, providing less data redundancy. To achieve desired bit error rates (BER)/block error rates (BLER) at these higher data rates, better receiver performance is desired.

To further improve capacity of wireless systems, antenna arrays are growing in prevalence. These arrays are used to better isolated users and enhance data throughput. Transmission arrays can be used to shape antenna patterns and reception arrays can be used to enhance reception. Although these techniques potentially lead to better capacity and throughput, they create problems at the receiver. Instead of processing information sent from a single transmit antenna to a single receive antenna, processing correlated/uncorrelated information from multiple transmit/receive antennas is required. Also, when a user moves between cells or sectors of a cell, the user is handed off between the cells or sectors. One type of handover is soft (for cells)/softer (for sectors). In soft/softer handover, the user receives and/or transmits from/to at least two cells/sectors. As a result, a receiver during soft/softer handover processes signals from multiple transmission/reception sources.

Accordingly, it is desirable to have high performance receivers.

SUMMARY

At least one communication is transmitted from a plurality of transmitting antennas. A signal is received. For each transmitting antenna, the received signal is equalized with respect to a channel experience by the communication between the transmitting antenna and the signal receiving, producing symbols. A contribution of that transmitting antenna to the received signal is constructed using the produced symbols. The contribution of that transmitting antenna is subtracted from the received signal for use in further equalization of the received signal with respect to others of the transmitting antennas.

BRIEF DESCRIPTION OF THE DRAWING(S)

DETAILED DESCRIPTION OF THE PREFERRED EMBODIMENT(S)

Although the features and elements of the present invention are described in the preferred embodiments in particular combinations, each feature or element can be used alone (without the other features and elements of the preferred embodiments) or in various combinations with or without other features and elements of the present invention.

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to a Node-B, site controller, access point or any other type of interfacing device in a wireless environment.

Although the joint channel equalizer interference canceller (JCE-IC) receiver is described in a code division multiple access environment, such as UMTS wideband code division multiple access (W-CDMA) both time division duplex (TDD) and frequency division duplex (FDD) modes, the receiver can be employed in any wireless communication system. Preferred uses for the joint channel equalizer interference canceller receiver are for HSDPA and high data rate CDMA2000 EVDV or EV-DO channels. The receiver can be used in a WTRU or base station.

Figure 1:
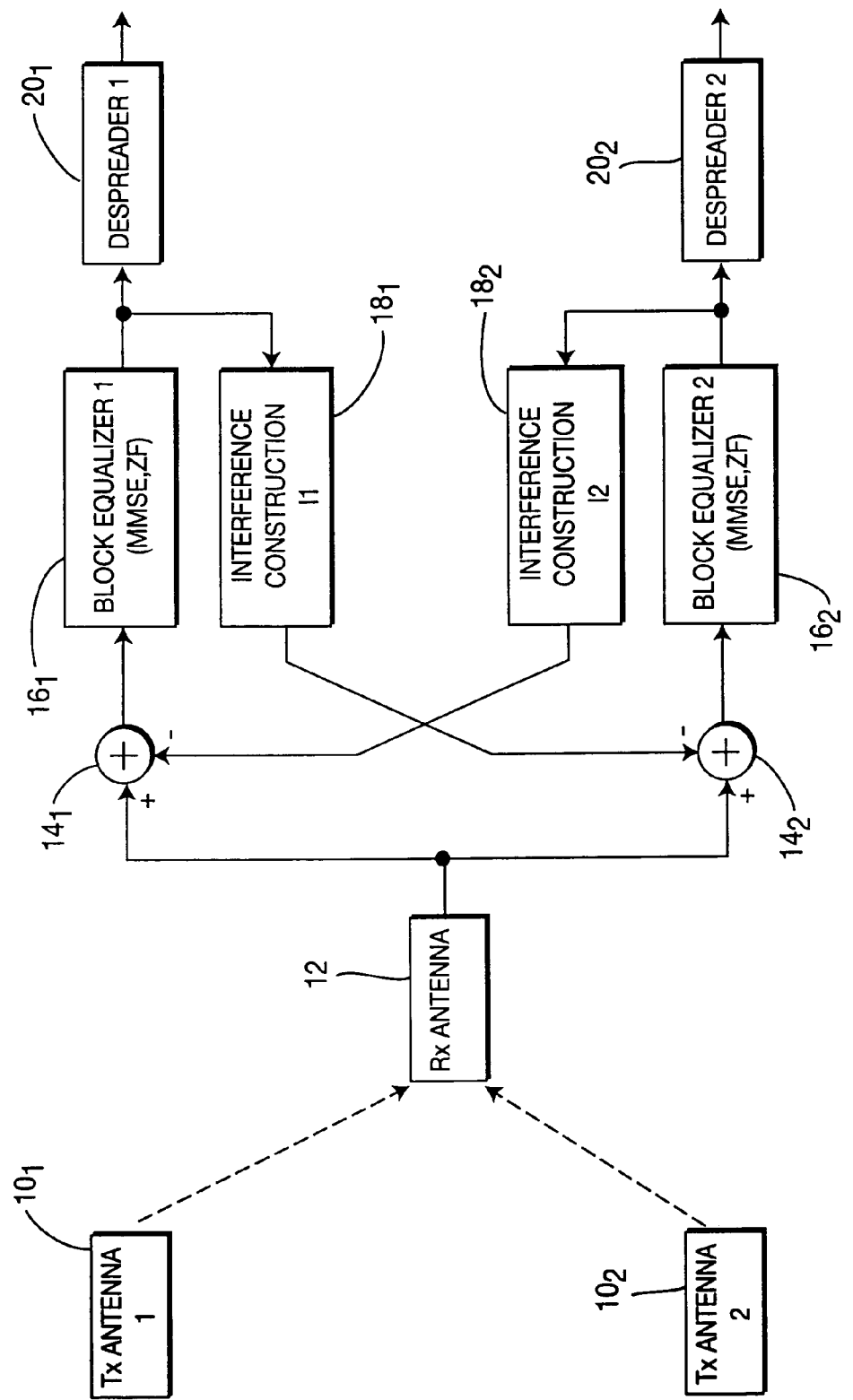
FIG. 1 is a simplified block diagram of an embodiment of a joint channel equalizer interference canceller (JCE-IC) receiver using block equalization.

FIG. 1 is a simplified block diagram of an embodiment of a JCE-IC receiver using block equalization. A receive antenna 12 receives a communication transmitted from two transmit antennas (transmit (TX) antenna 1 $10_1$ and and TX antenna 2 $10_2$). A first block equalizer (block equalizer 1 $16_1$) equalizes the signal received over the reception antenna 12 with respect to the wireless channel experienced from the TX antenna 1 $10_1$. A second block equalizer (block equalizer 2 $16_2$) equalizers the signal received over the reception antenna 12 with respect to the wireless channel experienced from TX antenna 2 $10_2$. The block equalizers $16_1$, $16_2$ preferably use either a minimum mean square error (MMSE) or zero forcing (ZF) based block equalization, although other techniques may be used.

The equalized spread symbols produced by block equalizer 1 $16_1$ are input into interference construction device 11 $18_1$. That interference construction device $18_1$ uses the equalized spread symbols to produce a contribution of the TX antenna 1 channel to the received signal. A subtractor $14_2$ subtracts the contribution of TX antenna 1 $10_1$ from the received signal producing an interference cancelled signal, which is input into block equalizer 2 $16_2$.

Similarly, the equalized spread symbols produced by block equalizer 2 $16_2$ are input into interference construction device 2 $18_2$. That interference construction device $18_2$ uses the equalized spread symbols to produce a contribution of the TX antenna 2 channel to the received signal. A subtractor $14_1$ subtracts the contribution of TX antenna 2 $10_2$ from the received signal producing an interference cancelled signal, which is input into block equalizer 1 $16_1$.

The interference construction devices $18_1$, $18_2$ construct samples that are properly time-aligned with the samples coming for the receive antenna 12. The time alignment can be implemented using delay elements or prediction. For example, a delay may be inserted in the upper or lower branch enabling the other branch to construct time-aligned estimates of signal components.

With respect to the interference cancellation, two techniques may be used, successive interference cancellation (SIC) or parallel interference cancellation (PIC). In SIC, the spread symbols of one transmit antenna are determined prior to determining the spread symbols of the other transmit antenna. As a result, prior to producing spread symbols of the second transmit antenna, the contribution of the first transmit antenna is cancelled. In PIC, the spread symbols of each transmit antenna are determined, prior to the interference cancellation. The contribution of each transmit antenna is removed from the other antenna simultaneously.

Although different approaches can be used to determine whether SIC or PIC is used, one preferred approach is as follows. The channel power of each antenna is determined. If the two antennas have similar received channel power (the difference is within a specified threshold), PIC is used. If the channel power differs, the antenna having the higher received power is processed first. It's contribution is cancelled from the lower power antenna prior to equalization.

A known sequences canceller can be implemented prior to interference cancellation and equalization. The known sequences include pilot signal, training sequences, synchronization channels, etc. The interference caused by known sequences are constructed by known sequences themselves convoluted with the channel information, potentially enhancing receiver performance.

After the final equalization, the spread symbols for each transmit antenna $10_1$, $10_2$ are despread by despreaders $20_1$, $20_2$, producing soft symbols. If the same symbols were transmitted over each antenna, the outputs of the two despreaders $20_1$, $20_2$ may be combined. The type of combining includes selecting one despreader output (such as having a higher signal to interference/noise ratio) over the other despreader output, maximum ratio combining (MRC), among others. The embodiment of FIG. 1 can be extended to more than two transmit antennas, such as N transmit antennas, as well as multiple receive antennas, such as M receive antennas. In such a situation, N×M equalizer, interference construction and subtractor chains may be used. Alternately, the number of chains may be decreased by processing multiple combinations of the N×M potential channels by one chain, such as by using a space-time equalization in the chains. To illustrate, only N chains may be used with each chain processing the signals from M reception antennas.

Figure 2:
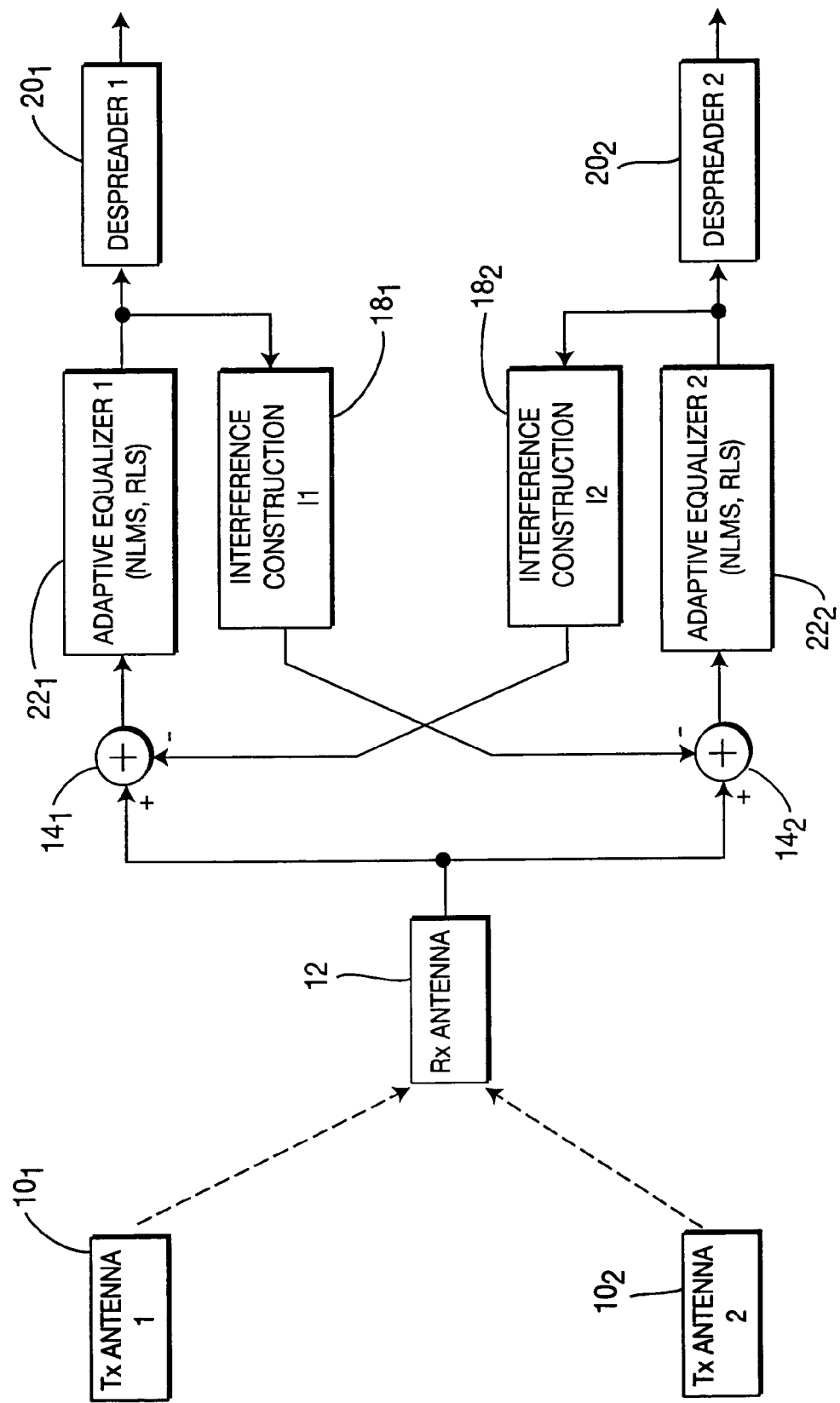
FIG. 2 is a simplified block diagram of an embodiment of a JCE-IC receiver using adaptive equalization.

FIG. 2 is a simplified block diagram of an embodiment of a JCE-IC receiver using adaptive equalization. The operation of the receiver in FIG. 2 is similar to FIG. 1, except the equalization is performed by adaptive equalizer 1 $22_1$ and adaptive equalizer 2 $22_2$. Techniques for adaptive equalization include normalized least mean squares, recursive least squares, among others.

Figure 3:
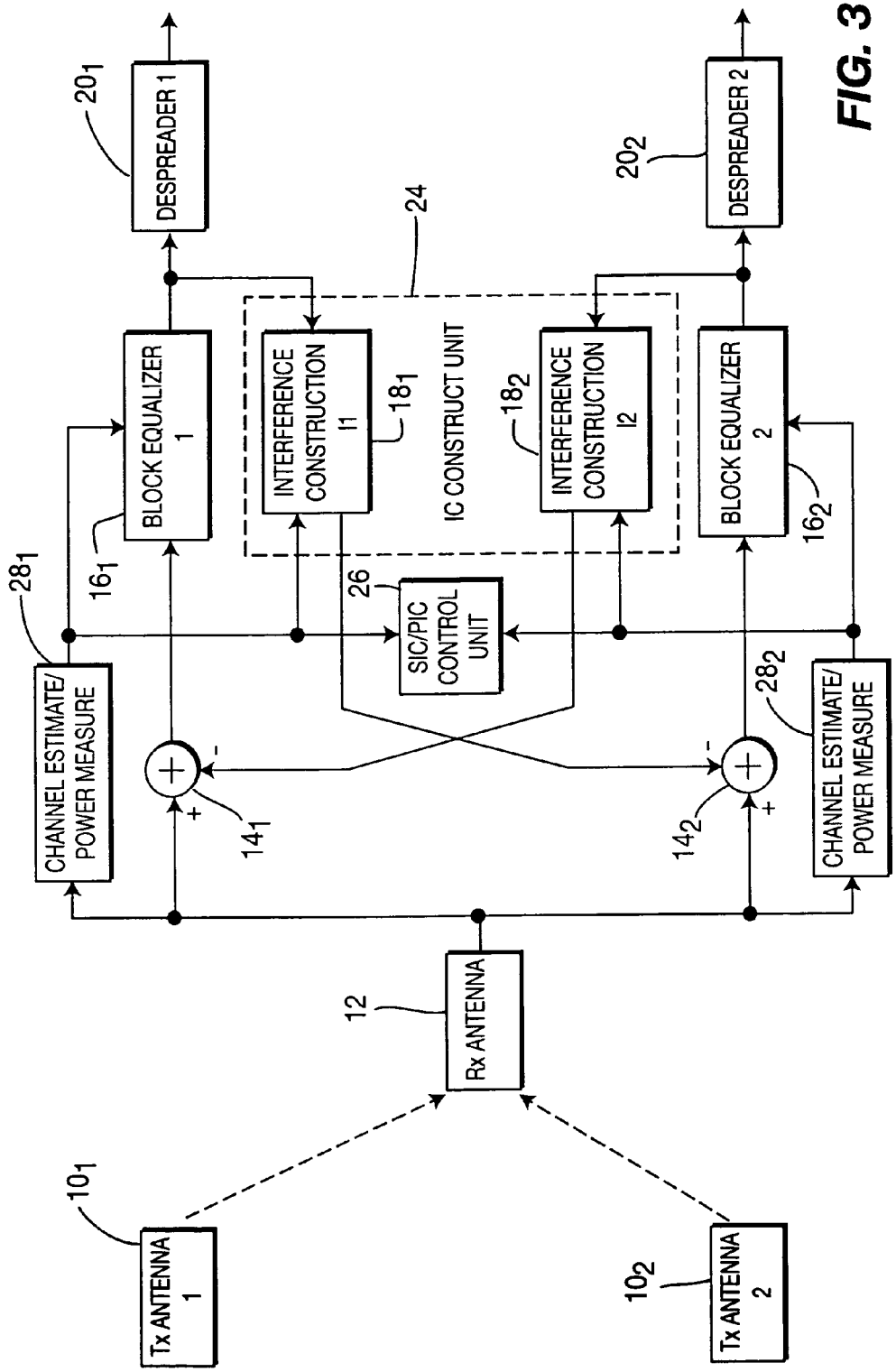
FIG. 3 is a simplified block diagram of an embodiment of a JCE-IC receiver using block equalization and interference cancellation control.

FIG. 3 is a simplified block diagram of an embodiment of a JCE-IC receiver using block equalization and interference cancellation control. A receive antenna 12 receives a communication transmitted from two transmit antennas (transmit (TX) antenna 1 $10_1$ and TX antenna 2 $10_2$). A first channel estimation/power measurement device $28_1$ estimates the channel response between the first transmit antenna $10_1$ and the receive antenna 12 and estimates the power level of that channel, using a midamble sequence, pilot or other technique. A first block equalizer (block equalizer 1 $16_1$) equalizes the signal received over the reception antenna 12 with respect to the wireless channel experienced from the TX antenna 1 $10_1$.

A second channel estimation/power measurement device $28_2$ estimates the channel response between the second transmit antenna $10_2$ and the receive antenna 12 and estimates the power level of that channel. A second block equalizer (block equalizer 2 $16_2$) equalizers the signal received over the reception antenna 12 with respect to the wireless channel experienced from TX antenna 2 $10_2$. The block equalizers $16_1$, $16_2$ preferably use either a minimum mean square error (MMSE) or zero forcing (ZF) based block equalization, although other techniques may be used.

The equalized spread symbols produced by block equalizer 1 $16_1$ and block equalizer 2 $16_2$ are input into an interference cancellation construction unit 24. As illustrated in FIG. 3, the interference construction unit 24 may have an interference construction device 11 $18_1$ for producing a contribution of the TX antenna 1 channel to the received signal and an interference construction device 12 $18_2$ for producing a contribution of the TX antenna 2 $10_2$ to the received signal. Each interference construction device $18_1$, $18_2$ uses the respective estimated channels to construct the respective contributions.

As illustrated in FIG. 3, a successive interference canceller (SIC)/parallel interference cancellation (PIC) controller 24 receives channel estimates for the channel from each transmit antenna $10_1$, $10_2$. The SIC/PIC controller 26, in the preferred embodiment, can switch the operation of the interference cancellation construct unit 24 to operate using SIC or PIC. The SIC/PIC controller may also determine the order of cancellation for a SIC configuration. Although FIG. 3 illustrates using a SIC/PIC controller 26, in other embodiments, the interference cancellation construct unit 24 may be configured to perform only SIC, PIC or another interference cancellation technique.

A subtractor $14_2$ subtracts the contribution of TX antenna 1 $10_1$ from the received signal producing an interference cancelled signal, which is input into block equalizer 2 $16_2$. Similarly, a subtractor $14_1$ subtracts the contribution of TX antenna 2 $10_2$ from the received signal producing and interference cancelled signal, which is input into block equalizer 1 $16_1$. As described previously for multi-code transmission, each code may be equalized separately, groups of codes may be equalized together or all the codes may be equalized together.

After the final equalization, the spread symbols for each transmit antenna $10_1$, $10_2$ are despread by despreaders $20_1$, $20_2$, producing soft symbols. If the same symbols were transmitted over each antenna $10_1$, $10_2$, the outputs of the two despreaders $20_1$, $20_2$ may be combined. The type of combining includes selecting one despreader output over the other despreader output, maximum ratio combining (MRC), among others. The embodiment of FIG. 3 can be extended to more than two transmit antennas, such as N transmit antennas, as well as multiple receive antennas, such as M receive antennas. In such a situation, N×M equalizer, interference construction and subtractor chains may be used. Alternately, the number of chains may be decreased by processing multiple combinations of the N×M potential channels by one chain, such as by using a space-time equalizer in the chains. To illustrate, only N chains may be used with each chain processing the signals from M reception antennas.

Figure 4:
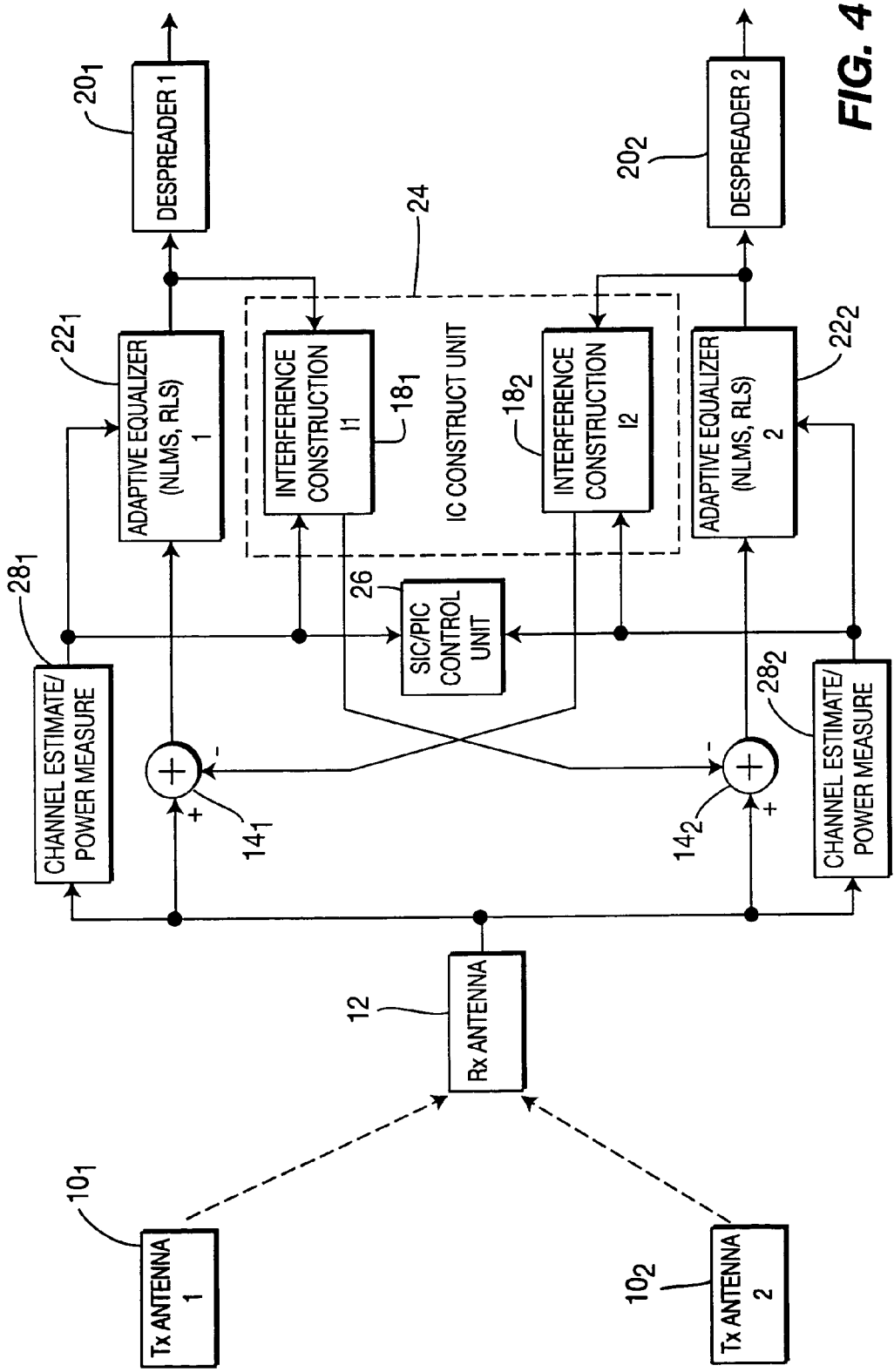
FIG. 4 is a simplified block diagram of an embodiment of a JCE-IC receiver using adaptive equalization and interference cancellation control.

FIG. 4 is a simplified block diagram of an embodiment of a JCE-IC receiver using adaptive equalization and interference cancellation control. The operation of the receiver in FIG. 4 is similar to FIG. 3, except the equalization is performed by adaptive equalizer 1 22$_1$ and adaptive equalizer 2 22$_2$. Techniques for adaptive equalization include normalized least mean squares, recursive least squares, among others.

Figure 5:
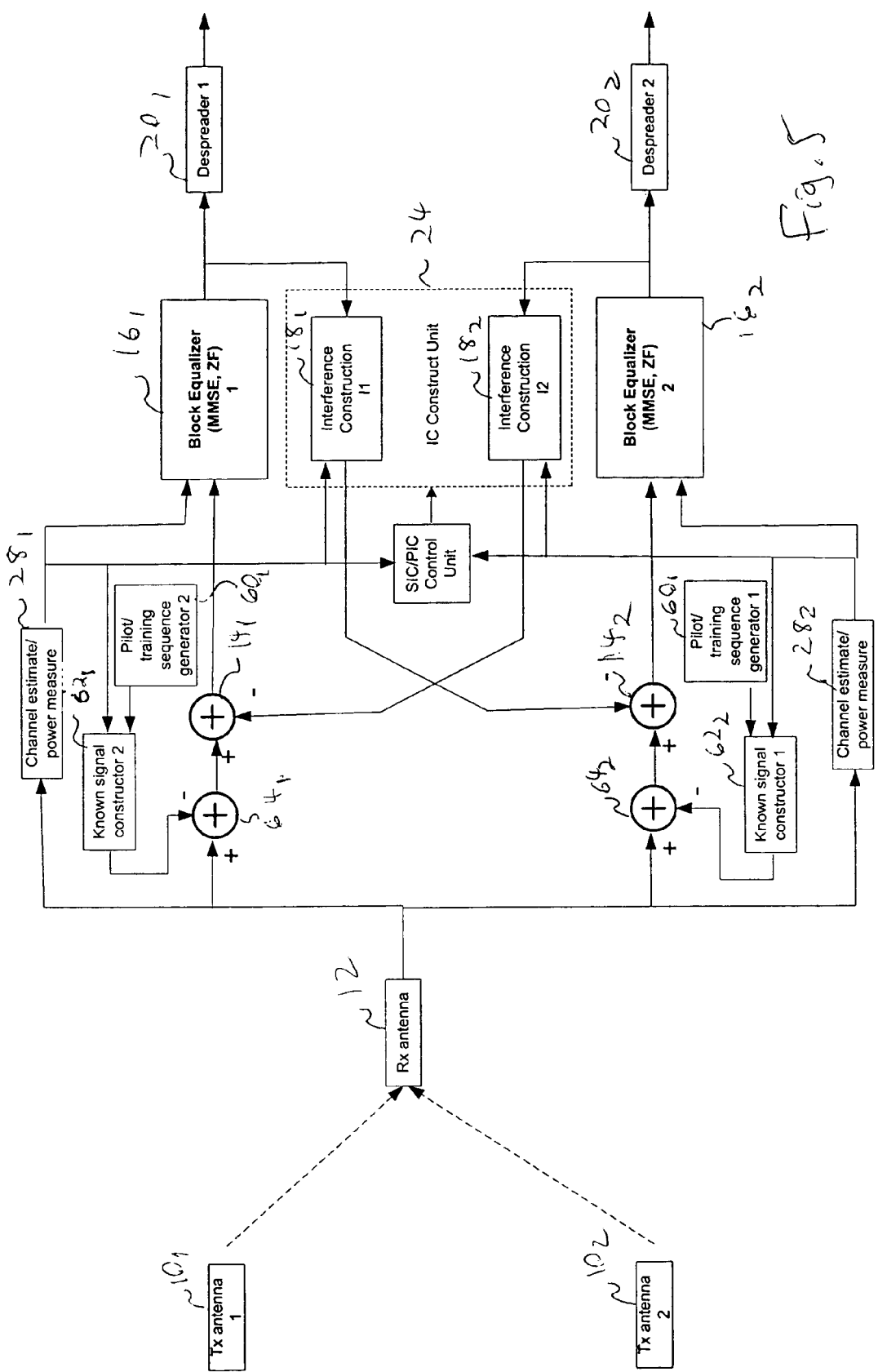
FIG. 5 is a simplified block diagram of an embodiment of a JCE-IC receiver using block equalization with interference cancellation control and pilot/training sequence cancellation.
Figure 6:
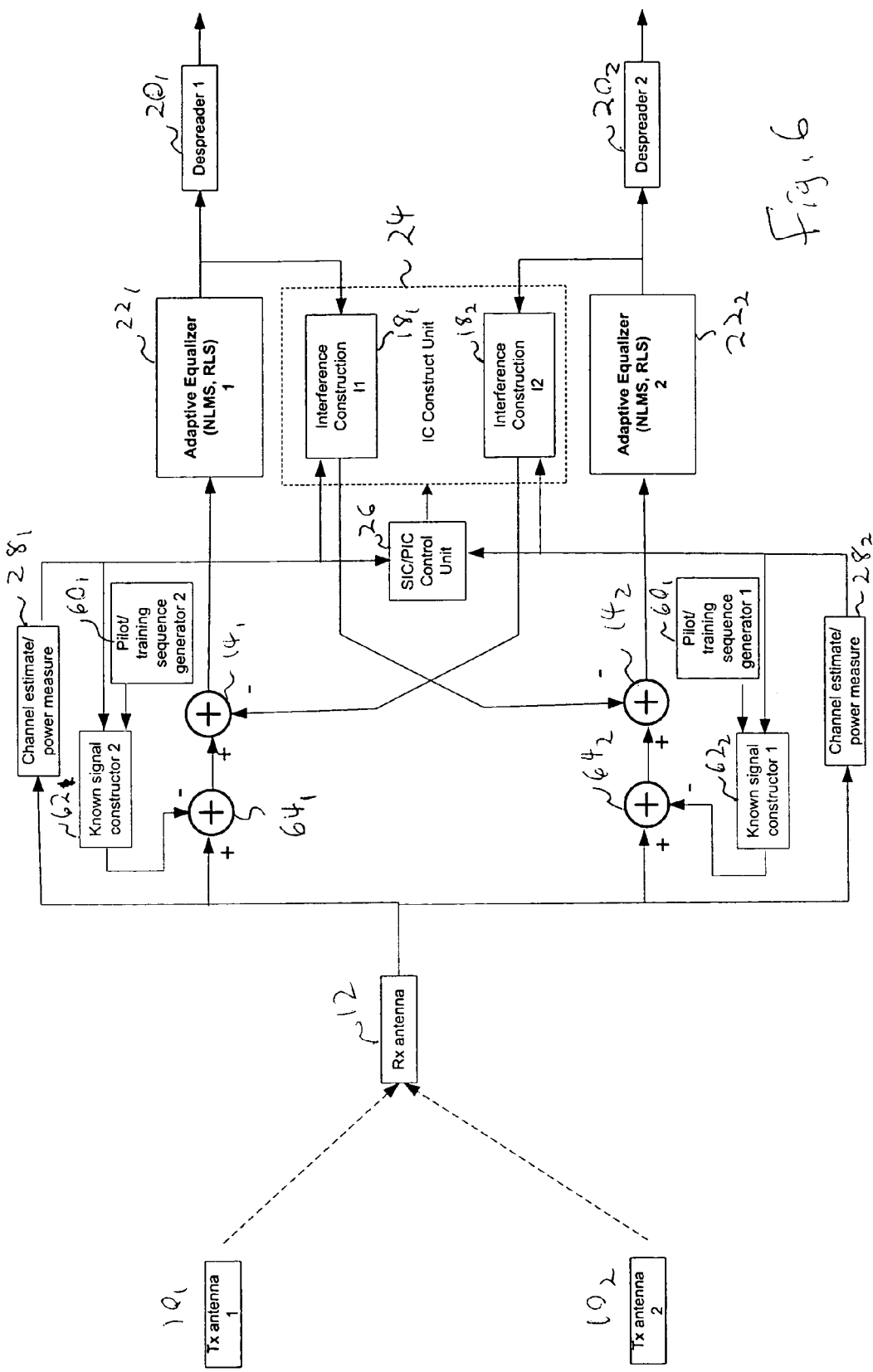
FIG. 6 is a simplified block diagram of an embodiment of a JCE-IC receiver using adaptive equalization with interference cancellation control and pilot/training sequence cancellation.

FIG. 5 is a simplified block diagram of an embodiment of a JCE-IC receiver using block equalization with interference control and known sequence cancellation, such as pilot, training sequences and synchronization signals. FIG. 6 is a simplified block diagram of an embodiment of a JCE-IC receiver using adaptive equalization with interference control and known sequence cancellation, such as pilot, training sequences and synchronization signals. FIG. 5 corresponds to FIG. 3 with the addition of the known sequence cancellation and FIG. 6 corresponds to FIG. 4 with the addition of the known sequence cancellation.

Referring to FIGS. 5 and 6, a pilot/training sequence generator 2 60$_1$ generates a known signal. A known signal constructor 2 62$_1$ produces the contribution of the known signal to the received signal. A subtractor 64$_1$ subtracts the known signal form the received vector and that interference cancelled signal is subsequently equalized. A pilot/training sequence generator 1 60$_2$ generates a known signal. A known signal constructor 1 62$_2$ produces the contribution of the known signal to the received signal. A subtractor 64$_2$ subtracts the known signal form the received vector and that interference cancelled signal is subsequently equalized.

An embodiment for processing a multi-code transmission using group equalization is as follows. J distinctive wireless channels exist between the transmitting antenna and the receiving antenna(s). To illustrate using FIG. 1, a wireless channel exists between transmit antenna 1 10$_1$ and the receive antenna 12 and a second wireless channel exists between transmit antenna 2 10$_2$ and the receive antenna 12. Accordingly, with respect to FIG. 1, J equals 2.

For J channels, the received signal model is per Equations 1 and 2.

$$r = \sum_{i=1}^{J} H_i s_i + \underline{n}$$ Equation 1

$$s_i = C_i \underline{d}^{(i)}$$ Equation 2 r is the received vector. $H_i$ is the channel responses for the $i^{th}$ channel. $s_i$ is the spread data vector for the $i^{th}$ channel and n is the noise vector.

The received vector r can be written in a joint form of multiple channel responses as per Equation 3.

$$r = Hs + n$$ Equation 3

The joint channel response matrix H consists of J distinctive channel responses per Equation 4.

$$H = [H_1, H_2, \ldots, H_J]$$ Equation 4

Using MMSE criteria, although other criteria may be used, the joint channel equalizer criteria is per Equation 5.

$$\hat{s} = (H^H H + \sigma^2 I)^{-1} H^H r$$ Equation 5

Figure 7:
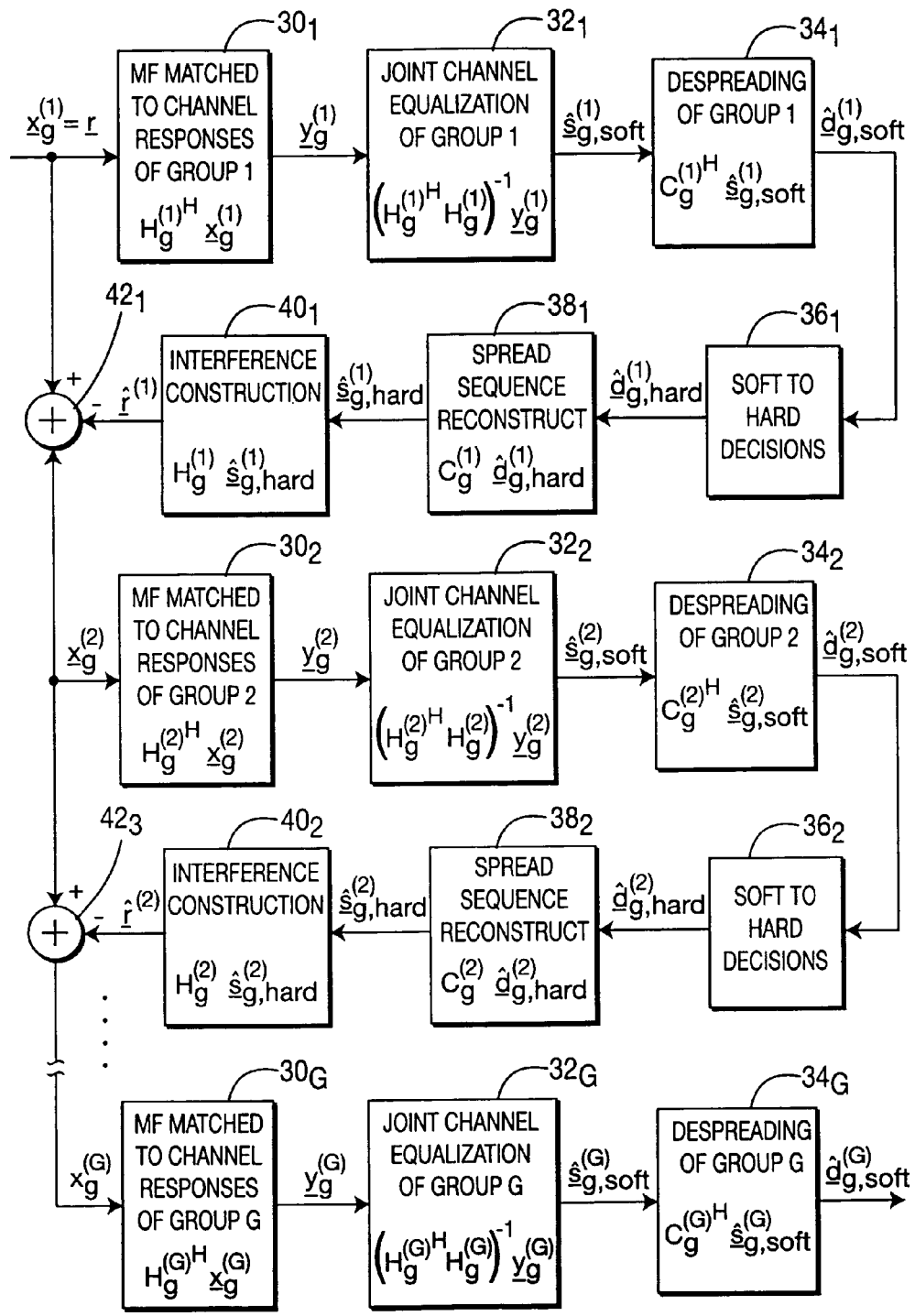
FIG. 7 is a simplified block diagram of successive code group cancellation.

Jointly equalizing the channel distortions of J distinctive channels typically requires considerable complexity. Dividing the joint channel responses into several smaller sub-joint channel responses is the basis for reducing receiver complexity. FIG. 7 provides a reduced complexity embodiment in a SIC architecture.

Each code is associated with its corresponding channels. All the codes are arranged in descending order of their received channel power to form a list. To illustrate, there are K codes and let k=1 . . . K represent this order. Let j=1 . . . J represent the order of their corresponding channels. Such an ordering can be based upon either a priori knowledge at the receiver or by other estimation schemes, such as channel estimation from a training sequence. The list is scanned and codes are grouped together that have roughly the same channel power, i.e., within a certain threshold of each other, into G groups. The groups are arranged in descending order of their power, where i=1 . . . G represent this order. $n_i$ is the number of codes in the $i^{th}$ group and $m_i$ is the number of distinctive channels in the $i^{th}$ group, thus, $$\sum_{i=1}^{G} n_i = K \text{ and } \sum_{i=1}^{G} m_i = J.$$

The receiver preferably consists of G stages. Starting with the strongest group, i=1, the following is performed.

$H_g^{(i)}$ consists of the channel impulse responses corresponding to codes in the $i^{th}$ group. The interference-corrected received vector, $x_g^{(i)}$, is per Equation 6.

$$x_g^{(i)} = H_g^{(i)} s_g^{(i)} + n$$ Equation 6

$s_g^{(i)}$ represents the composite spread sequence of information bearing symbols carried by all codes in the $i^{th}$ group, i.e., $$\underline{s}_g^{(i)} = \sum_{n=1}^{n_i} C_g^{(n)} \underline{d}_g^{(n)}.$$

$x_g^{(i)} = r$ and $x_g^{(i)}$ for i=2 . . . G, are obtained by subtracting out the contribution of all previous groups from r. The contribution to r of all groups weaker than the $i^{th}$ group are ignored. Matched filtering is performed on $x_g^{(i)}$, by matched filters 30$_1$, 30$_2$, 30$_G$.

$$\underline{y}_g^{(i)} = H_g^{(i)H} x_g^{(i)}$$ Equation 7

The matched filtering operation of Equation 7 correlates $x^{g(i)}$ with the channel-response of each code in the $i^{th}$ group. Channel equalization is performed by joint channel equalizers 32$_1$, 32$_2$, 32$_G$ to obtain estimates of $s_g^{(i)}$ by, such as, either obtaining the least-squares (zero-forcing) solution of Equation 8.

$$\hat{s}_{g,soft}^{(i)} = \left(H_g^{(i)H} H_g^{(i)}\right)^{-1} y_g^{(i)} \qquad \text{Equation 8}$$

The MMSE solution is per Equation 9.

$$\hat{s}_{g,soft}^{(i)} = \left(H_g^{(i)H} H_g^{(i)} + \sigma^2 I\right)^{-1} y_g^{(i)} \qquad \text{Equation 9}$$

$H^H H$ of Equation 5 is a block circular matrix and $H_g^{(i)H} H_g^{(i)}$ is also a block circular matrix. Equations 8 and 9 can be solved such as by, for example, a block fast Fourier transform or Cholesky decomposition.

A soft decision estimate of $d_g^{(i)}$ is obtained by despreading by despreaders $34_1, 34_2, 34_G$ the composite spread sequence, per Equation 10.

$$\hat{d}_{g,soft}^{(i,n)} = C_g^{(n)H} s_g^{(i)}, n = 1, \ldots, n_i \qquad \text{Equation 10}$$

If hard decisions are required for the interference cancellation, $$\hat{d}_{g,soft}^{(i,n)}$$

is converted to hard decisions, $$\hat{d}_{g,hard}^{(i,n)},$$

such as by soft to hard decision devices $36_1, 36_2, 36_G$. Alternately, a different technique for interference cancellation may be used. The hard copy of spread sequence is per Equation 11 and performed by spread sequence reconstruction device $38_1$, $38_2, 38_G$.

$$s_{g,hard}^{(i)} = \sum_{n=1}^{n_i} C_g^{(i,n)} \hat{d}_{g,hard}^{(i,n)} \qquad \text{Equation 11}$$

The contribution of the $i^{th}$ group to r is estimated by per Equation 12 and performed by interference construction devices $40_1, 40_2$.

$$\hat{r}^{(i)} = H_g^{(i)} \hat{s}_{g,soft}^{(i)} \qquad \text{Equation 12}$$

Equation 12 represents an estimate of the multiple access interference (MAI) induced by the $i^{th}$ group onto the remaining groups. A new interference-corrected vector is determined by subtracting this MAI from the interference-corrected vector of the previous stage, $x_g^{(i)}$, per Equation 13 and performed by subtractors $42_1, 42_{G-1}$.

$$x_g^{(i+1)} = x_g^{(i)} - \hat{r}^{(i)}, \text{ where } x_g^{(i)} = r \qquad \text{Equation 13}$$

In a subsequent stage, the result of Equation 13 is used in Equation 7. When a hard interference sequence is generated, the $$\hat{r}^{(i)} = H_g^{(i)} \hat{s}_{g,hard}^{(i)}$$

is used instead of Equation 12. The process is repeated for all stages to obtain the remaining $$\hat{d}_{g,soft}^{(i)} \text{ and } \hat{d}_{g,hard}^{(i)}, \text{ for } i = 1 \cdots G.$$

However, interference cancellation does not need to be performed for the last stage. Additionally, if all the data of codes of interest are detected prior to the last stage, stages following the last group of the codes of interest need not be performed. To illustrate, a WTRU may have all of its assigned codes within the first group, G=1. As a result, the WTRU receiver does not need to process subsequent groups.

One potential advantage of JCE-IC based advanced receiver is that it can handle the case of multiple channel transmissions in the uplink which naturally occurs when, for example, multiple terminals transmit to a base station. It can handle diversity channel transmissions in the downlink. The diversity channels may be due to the use of transmit diversity such as transmit adaptive antennas (TxAA) beamforming or smart antennas. Another advantage can be achieved by hard-limiting the group size of the channel equalizer. This can be done by limiting the maximum number of channels that can be grouped together in each group to certain numbers regardless their power levels. For example by setting $m_i$ as max($m_i$) =3,i=1,2, . . . , G, the maximum number of distinct channels in each group can not exceed three, reducing the hardware complexity.

JCE-IC works well when code groups have unequal power. Other types of receivers, such as block linear equalizer joint detectors (BLE-JD) that usually experience degradation when received code powers are not equal. In more advanced wireless systems, there are often codes of unequal power. For example, the adaptive weights in TxAA or beamforming that are applied to the transmitted codes create unequal received code power when composite signals arrive at receiver. Also, JCE-IC does not require code detection such as blind code detection. When working on the soft spread sequence, the interference construction block receives input directly from joint channel equalizer's output without needing the list of all transmitted codes for correct operations. Without code detection, the complexity of data detection is reduced, achieving simpler subsystems.

The receiver components of FIGS. 1-5 can be implemented on an integrated circuit (IC), such as an application specific integrated circuit (ASIC), multiple ICs, discrete components, or a combination of discrete components and IC(s).

What is claimed is:

1. A method for receiving at least one communication transmitted from a plurality of transmitting antennas, the method comprising:
    receiving a signal;
    for each transmitting antenna:
        equalizing the received signal with respect to a channel experience by the communication between the transmitting antenna and the receiving, producing symbols;
        constructing a contribution of that transmitting antenna to the received signal using the produced symbols;

subtracting the contribution of that transmitting antenna from the received signal for use in further equalization of the received signal with respect to others of the transmitting antennas;

selectively using either successive interference cancellation (SIC) or parallel interference cancellation (PIC), for SIC the equalizing the received signal with respect to one of the transmitting antennas and that one transmitting antennas contribution is cancelled from the received signal prior to the equalizing with respect to others of the transmitting antennas, and for PIC the equalizing the received signal with respect to all of the transmitting antennas is performed prior to canceling a contribution of any of the transmitting antennas from the received signal; and measuring a channel power of each transmitting antenna, comparing the measured channel power for each transmitting antenna and based on the comparison, determining whether SIC or PIC is to be selected.

2. The method of claim 1 utilizing successive interference cancellation, such that the equalizing the received signal with respect to one of the transmitting antennas and that one transmitting antennas contribution is cancelled from the received signal prior to the equalizing with respect to others of the transmitting antennas.

3. The method of claim 1 utilizing parallel interference cancellation, such that the equalizing the received signal with respect to all of the transmitting antennas is performed prior to canceling a contribution of any of the transmitting antennas from the received signal.

4. The method of claim 1 wherein if the measured channel power for each transmitting antenna is within a threshold, selecting PIC and if the measured channel power for each transmitting antenna is not within the threshold, selecting SIC.

5. The method of claim 4 wherein if SIC is selected, the equalizing with respect to the channel of the transmitting antenna having a highest power level is performed prior to the other transmitting antennas.

6. The method of claim 1 wherein the at least one communication includes a plurality of codes and the equalizing is performed collectively on all the codes.

7. The method of claim 1 wherein the at least one communication includes a plurality of codes and the equalizing is performed sequentially on each code individually.

8. The method of claim 1 wherein the at least one communication includes a plurality of codes and the plurality of codes are grouped into code groups, at least one code group having more than one code and the equalizing is performed sequentially on each code individually.

9. The method of claim 1 wherein the produced symbols are spread symbols.

10. The method of claim 9 wherein the produces spread symbols are despread.

11. The method of claim 10 wherein the despread symbols with respect to the transmitting antenna having the largest receiver signal to interference/noise level is selected over the despread symbols of others of the transmitting antennas.

12. The method of claim 10 wherein the despread symbols for all the transmitting antenna are combined.

13. The method of claim 12 wherein the combining is performed by maximum ratio combining.

14. A wireless transmit/receive unit (WTRU) for receiving at least one communication transmitted from a plurality of transmitting antennas, the WTRU comprising:

an antenna for receiving a signal;

for each transmitting antenna:

an equalizer for equalizing the received signal with respect to a channel experience by the communication between the transmitting antenna and the receiving, producing symbols;

an interference construction device for constructing a contribution of that transmitting antenna to the received signal using the produced symbols;

a subtractor for subtracting the contribution of that transmitting antenna from the received signal for use in further equalization of the received signal with respect to others of the transmitting antennas;

a SIC/PIC control unit for selectively using either successive interference cancellation (SIC) or parallel interference cancellation (PIC), for SIC the equalizing the received signal with respect to one of the transmitting antennas and that one transmitting antennas contribution is cancelled from the received signal prior to the equalizing with respect to others of the transmitting antennas, and for PIC the equalizing the received signal with respect to all of the transmitting antennas is performed prior to canceling a contribution of any of the transmitting antennas from the received signal; and a power measuring device for measuring a channel power of each transmitting antenna, means for comparing the measured channel power for each transmitting antenna and means based on the comparison, for determining whether SIC or PIC is to be selected.

15. The WTRU of claim 14 utilizing successive interference cancellation, such that the equalizing the received signal with respect to one of the transmitting antennas and that one transmitting antennas contribution is cancelled from the received signal prior to the equalizing with respect to others of the transmitting antennas.

16. The WTRU of claim 14 utilizing parallel interference cancellation, such that the equalizing the received signal with respect to all of the transmitting antennas is performed prior to canceling a contribution of any of the transmitting antennas from the received signal.

17. The WTRU of claim 14 wherein if the measured channel power for each transmitting antenna is within a threshold, selecting PIC and if the measured channel power for each transmitting antenna is not within the threshold, selecting SIC.

18. The WTRU of claim 17 wherein if SIC is selected, the equalizing with respect to the channel of the transmitting antenna having a highest power level is performed prior to the other transmitting antennas.

19. The WTRU of claim 14 wherein the at least one communication includes a plurality of codes and the equalizing is performed collectively on all the codes.

20. The WTRU of claim 14 wherein the at least one communication includes a plurality of codes and the equalizing is performed sequentially on each code individually.

21. The WTRU of claim 14 wherein the at least one communication includes a plurality of codes and the plurality of codes are grouped into code groups, at least one code group having more than one code and the equalizing is performed sequentially on each code individually.

22. The WTRU of claim 14 wherein the produced symbols are spread symbols.

23. The WTRU of claim 22 further comprising at least one despreader for despreading the spread symbols.

24. The WTRU of claim 23 wherein the despread symbols with respect to the transmitting antenna having the largest receiver signal to interference/noise level is selected over the despread symbols of others of the transmitting antennas.

25. The WTRU of claim 23 wherein the despread symbols for all the transmitting antenna are combined.

26. The WTRU of claim 25 wherein the combining is performed by maximum ratio combining.

27. A base station for receiving at least one communication transmitted from a plurality of transmitting antennas, the base station comprising:
an antenna for receiving a signal;
for each transmitting antenna:
an equalizer for equalizing the received signal with respect to a channel experience by the communication between the transmitting antenna and the receiving, producing symbols;
an interference construction device for constructing a contribution of that transmitting antenna to the received signal using the produced symbols;
a subtractor for subtracting the contribution of that transmitting antenna from the received signal for use in further equalization of the received signal with respect to others of the transmitting antennas;
a SIC/PIC control unit for selectively using either successive interference cancellation (SIC) or parallel interference cancellation (PIC), for SIC the equalizing the received signal with respect to one of the transmitting antennas and that one transmitting antennas contribution is cancelled from the received signal prior to the equalizing with respect to others of the transmitting antennas, and for PIC the equalizing the received signal with respect to all of the transmitting antennas is performed prior to canceling a contribution of any of the transmitting antennas from the received signal; and
a power measuring device for measuring a channel power of each transmitting antenna, means for comparing the measured channel power for each transmitting antenna and means based on the comparison, for determining whether SIC or PIC is to be selected.

28. The base station of claim 27 utilizing successive interference cancellation, such that the equalizing the received signal with respect to one of the transmitting antennas and that one transmitting antennas contribution is cancelled from the received signal prior to the equalizing with respect to others of the transmitting antennas.

29. The base station of claim 27 utilizing parallel interference cancellation, such that the equalizing the received signal with respect to all of the transmitting antennas is performed prior to canceling a contribution of any of the transmitting antennas from the received signal.

30. The base station of claim 27 wherein if the measured channel power for each transmitting antenna is within a threshold, selecting PIC and if the measured channel power for each transmitting antenna is not within the threshold, selecting SIC.

31. The base station of claim 30 wherein if SIC is selected, the equalizing with respect to the channel of the transmitting antenna having a highest power level is performed prior to the other transmitting antennas.

32. The base station of claim 27 wherein the at least one communication includes a plurality of codes and the equalizing is performed collectively on all the codes.

33. The base station of claim 27 wherein the at least one communication includes a plurality of codes and the equalizing is performed sequentially on each code individually.

34. The base station of claim 27 wherein the at least one communication includes a plurality of codes and the plurality of codes are grouped into code groups, at least one code group having more than one code and the equalizing is performed sequentially on each code individually.

35. The base station of claim 27 wherein the produced symbols are spread symbols.

36. The base station of claim 35 further comprising at least one despreader for despreading the spread symbols.

37. The base station of claim 36 wherein the despread symbols with respect to the transmitting antenna having the largest receiver signal to interference/noise level is selected over the despread symbols of others of the transmitting antennas.

38. The base station of claim 36 wherein the despread symbols for all the transmitting antenna are combined.

39. The base station of claim 38 wherein the combining is performed by maximum ratio combining.

* * * * *

UNITED STATES PATENT AND TRADEMARK OFFICE
CERTIFICATE OF CORRECTION

PATENT NO. : 7,437,135 B2
APPLICATION NO. : 10/977525
DATED : October 14, 2008
INVENTOR(S) : Pan et al.

It is certified that error appears in the above-identified patent and that said Letters Patent is hereby corrected as shown below:

ON THE TITLE PAGE

Item (56), U.S. PATENT DOCUMENTS, page 3, left column, delete line beginning with "6,697,441" and insert therefor --6,697,441 B1 2/2004 Bottomley et al.--.

Item (56), U.S. PATENT DOCUMENTS, page 4, right column, delete line beginning with "2003/0227960" and insert therefor --2003/0227960 A1 12/2003 Papasakellariou--.

Item (56), FOREIGN PATENT DOCUMENTS, page 5, left column, after line beginning with "EP 0980149" insert --EP 0981206 A1 02/2000--.

Item (56), FOREIGN PATENT DOCUMENTS, page 6, right column, delete line beginning with "WO 02/0655719" and insert therefor --WO 02/065719 A1 08/2002--.

Item (56), FOREIGN PATENT DOCUMENTS, page 6, right column, delete line beginning with "WO 02/0803979" and insert therefor --WO 02/080379 A2 10/2002--.

IN THE DRAWINGS

At FIG. 7, input to element "$30_G$" delete "$x_g^{(G)}$" and insert therefor --$\underline{x}_g^{(G)}$--.

At column 2, lines 57-58, after "(block equalizer 2 16$_2$)" delete "equalizers" and insert therefor --equalizes--.

At column 3, line 15, before the words "the receive" delete "for" and insert therefor --from--.

At column 3, line 36, after the word "channel" delete "power differs" and insert therefor --powers differ--.

At column 3, line 37, before the word "contribution" delete "It's" and insert therefor --Its--.

At column 4, line 52, after the word "producing" delete "and" and insert therefor --an--.

UNITED STATES PATENT AND TRADEMARK OFFICE
CERTIFICATE OF CORRECTION

PATENT NO. : 7,437,135 B2
APPLICATION NO. : 10/977525
DATED : October 14, 2008
INVENTOR(S) : Pan et al.

It is certified that error appears in the above-identified patent and that said Letters Patent is hereby corrected as shown below:

At column 5, line 32, after the word "signal" delete "form" and insert therefor --from--.

At column 5, line 36, after the word "signal" delete "form" and insert therefor --from--.

At column 5, line 57, before the words "is the" delete "r" and insert therefor --$\underline{r}$--.

At column 5, line 58, before the words "is the" delete "$s_i$" and insert therefor --$\underline{s}_i$--.

At column 5, line 59, before the words "is the" delete "n" and insert therefor --$\underline{n}$--.

At column 5, line 60, before the words "can be" delete "r" and insert therefor --$\underline{r}$--.

At column 5, delete "Equation 3" and insert therefor --$\underline{r} = H\underline{s} + \underline{n}$--.

At column 6, delete "Equation 5" and insert therefor -$\underline{\hat{s}} = (H^H H + \sigma^2 I)^{-1} H^H \underline{r}$--.

At column 6, line 39, after the word "vector" delete "$x_g^{(i)}$" and insert therefor --$\underline{x}_g^{(i)}$--.

At column 6, delete "Equation 6" and insert therefor --$\underline{x}_g^{(i)} = H_g^{(i)} \underline{s}_g^{(i)} + \underline{n}$--.

At column 6, line 42, before the word "represents" delete "$s_g^{(i)}$" and insert therefor --$\underline{s}_g^{(i)}$--.

At column 6, line 51, before the words "for i=2" delete "$x_g^{(i)} = r$ and $x_g^{(i)}$" and insert therefor --$\underline{x}_g^{(i)} = \underline{r}$ and $\underline{x}_g^{(i)}$--.

At column 6, line 52, before the word "from" delete "r." and insert therefor --$\underline{r}$.--.

At column 6, line 53, before the words "of all" delete "r" and insert therefor --$\underline{r}$--.

At column 6, line 54, after the words "performed on" delete "$x_g^{(i)}$" and insert therefor --$\underline{x}_g^{(i)}$--.

At column 6, line 63, before the words "with the" delete "$x^{g(i)}$" and insert therefor --$\underline{x}_g^{(i)}$--.

At column 6, line 65, after the words "estimates of" delete "$s_g^{(i)}$" and insert therefor --$\underline{s}_g^{(i)}$--.

UNITED STATES PATENT AND TRADEMARK OFFICE
CERTIFICATE OF CORRECTION

PATENT NO.       : 7,437,135 B2
APPLICATION NO.  : 10/977525
DATED            : October 14, 2008
INVENTOR(S)      : Pan et al.

It is certified that error appears in the above-identified patent and that said Letters Patent is hereby corrected as shown below:

At column 7, delete "Equation 8" and insert therefor -- $\hat{\underline{s}}_{g,soft}^{(i)} = (H_g^{(i)H} H_g^{(i)})^{-1} \underline{y}_g^{(i)}$ --.

At column 7, line 17, after the words "estimate of" delete "$d_g^{(i)}$" and insert therefor --$\underline{d}_g^{(i)}$--.

At column 7, line 50, after the words "group to" delete "r is estimated by" and insert therefor --$\underline{r}$ is estimated--.

At column 7, line 61, after the word "stage," delete "$x_g^{(i)}$" and insert --$\underline{x}_g^{(i)}$--.

At column 7, delete "Equation 13" and insert therefor --$\underline{x}_g^{(i+1)} + \underline{x}_g^{(i)} - \hat{\underline{r}}^{(i)}$ , where $\underline{x}_g^{(i)} = \underline{r}$--.

At claim 1, column 9, line 9, before the word "contribution" delete "antennas" and insert therefor --antenna's--.

At claim 2, column 9, line 23, before the word "contribution" delete "antennas" and insert therefor --antenna's--.

At claim 10, column 9, line 54, before the word "spread" delete "produces" and insert therefor --produced--.

At claim 14, column 10, line 14, before "SIC/PIC" delete "a" and insert therefor --an--.

At claim 14, column 10, line 18, before the word "contribution" delete "antennas" and insert therefor --antenna's --.

At claim 15, column 10, line 33, before the word "contribution" delete "antennas" and insert therefor --antenna's--.

At claim 25, column 11, line 4, before the words "are combined" delete "antennas" and insert therefor --antenna's--.

UNITED STATES PATENT AND TRADEMARK OFFICE
CERTIFICATE OF CORRECTION

PATENT NO. : 7,437,135 B2
APPLICATION NO. : 10/977525
DATED : October 14, 2008
INVENTOR(S) : Pan et al.

It is certified that error appears in the above-identified patent and that said Letters Patent is hereby corrected as shown below:

At claim 27, column 11, line 23, before "SIC/PIC" delete "a" and insert therefor --an--.

At claim 27, column 11, line 27, before the word "contribution" delete "antennas" and insert therefor --antenna's--.

At claim 28, column 11, line 42, before the word "contribution" delete "antennas" and insert therefor --antenna's--.

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,437,135 B2  Page 1 of 1
APPLICATION NO. : 10/977525
DATED : October 14, 2008
INVENTOR(S) : Pan et al.

It is certified that error appears in the above-identified patent and that said Letters Patent is hereby corrected as shown below:

At column 7, line 63, delete "Equation 13" and insert therefor

-- $\underline{x}_g^{(i+1)} = \underline{x}_g^{(i)} - \hat{\underline{r}}^{(i)}$, where $\underline{x}_g^{(i)} = \underline{r}$ --.

Signed and Sealed this

Ninth Day of June, 2009

JOHN DOLL
*Acting Director of the United States Patent and Trademark Office*